(12) United States Patent  
Carson

(10) Patent No.: US 8,573,655 B2  
(45) Date of Patent: Nov. 5, 2013

(54) PIPE SEALING TOOL WITH EXTERNAL CLAMP

(75) Inventor: Glenn Carson, Sarnia (CA)

(73) Assignee: CAR-BER Investments Inc., Wallaceburg (CA)

( * ) Notice: Subject to any disclaimer, the term of this patent is extended or adjusted under 35 U.S.C. 154(b) by 539 days.

(21) Appl. No.: 12/715,168

(22) Filed: Mar. 1, 2010

(65) Prior Publication Data

US 2010/0206416 A1 Aug. 19, 2010

Related U.S. Application Data

(63) Continuation-in-part of application No. 12/098,273, filed on Apr. 4, 2008, now Pat. No. 7,669,899, which is a continuation of application No. PCT/CA2006/001641, filed on Oct. 6, 2006.

(60) Provisional application No. 60/723,915, filed on Oct. 6, 2005.

(51) Int. Cl.  
*F16L 23/00* (2006.01)

(52) U.S. Cl.  
USPC ............. 285/415; 285/368; 285/901; 138/89; 29/525.11

(58) Field of Classification Search  
USPC ......... 285/419, 373, 411, 412, 368, 901, 415; 138/89, 90, 91, 94; 29/282, 462, 29/525.11  
See application file for complete search history.

(56) References Cited

U.S. PATENT DOCUMENTS

| 608,613 A | 8/1898 | Linich |
| 1,099,158 A * | 6/1914 | Baker ............................ 138/89 |
| 1,855,494 A | 4/1932 | Sorensen |
| 2,289,164 A | 7/1942 | Arnold et al. |

(Continued)

FOREIGN PATENT DOCUMENTS

| CA | 2605728 | 1/2008 |
| EP | 0339525 | 11/1989 |

(Continued)

OTHER PUBLICATIONS

Supplementary European Search Report issued on Jun. 2, 2009 in corresponding European application No. 06 79 0801.

(Continued)

*Primary Examiner* — David E Bochna  
(74) *Attorney, Agent, or Firm* — Santosh K Chari; Blake, Cassels & Graydon LLP

(57) ABSTRACT

An apparatus for sealing an open end of a pipe includes a clamp for frictionally being secured to the exterior of the pipe, a sealing plate for covering the open end of the pipe and being connectable to the clamp, and an urging mechanism for urging the sealing plate towards the clamp and for forming a seal between the sealing plate and the open end of the pipe. In one aspect, the clamp comprises an annular body formed by at least two sections that are radially tightened over the pipe exterior. In another aspect, the clamp comprises cooperating annular bodies, one capable of radially narrowing the other for frictionally engaging the pipe outer surface. In another aspect the method provides a method of sealing an end of a pipe. According to the invention, once the open end is sealed, the interior of the pipe may be pressurized, for example for testing the integrity thereof.

18 Claims, 16 Drawing Sheets

(56) References Cited

U.S. PATENT DOCUMENTS

| | | | |
|---|---|---|---|
| 2,329,801 A | | 9/1943 | Wellborn |
| 2,403,859 A | * | 7/1946 | Hatfield ............................ 138/90 |
| 2,793,057 A | | 5/1957 | McGugin |
| 2,873,764 A | | 2/1959 | Lombard et al. |
| 2,944,842 A | | 7/1960 | Stiff |
| 3,181,895 A | | 5/1965 | Cator |
| 3,495,626 A | | 2/1970 | Nagel |
| 3,549,178 A | | 12/1970 | Evert |
| 3,594,893 A | | 7/1971 | Kuypers |
| 3,730,317 A | | 5/1973 | Jaeschke |
| 3,765,560 A | * | 10/1973 | Kemp ............................ 138/90 |
| 3,792,729 A | | 2/1974 | Perry |
| 3,844,313 A | * | 10/1974 | Arnold ............................ 138/90 |
| 3,986,387 A | * | 10/1976 | Luchi ............................ 73/49.8 |
| 4,004,298 A | | 1/1977 | Freed |
| 4,040,289 A | * | 8/1977 | Clark et al. ..................... 138/90 |
| 4,077,250 A | | 3/1978 | Wesch |
| 4,336,959 A | | 6/1982 | Roche |
| 4,372,587 A | | 2/1983 | Roche |
| 4,381,800 A | | 5/1983 | Leslie |
| 4,635,970 A | | 1/1987 | Haines |
| 4,809,751 A | | 3/1989 | McKenzie |
| 4,887,646 A | * | 12/1989 | Groves ............................ 138/90 |
| 5,096,230 A | | 3/1992 | Pausch et al. |
| 5,190,324 A | | 3/1993 | Bird et al. |
| 5,419,354 A | | 5/1995 | Krynicki |
| 5,844,127 A | | 12/1998 | Berube et al. |
| 6,022,454 A | | 2/2000 | Fetzer |
| 6,065,784 A | | 5/2000 | Lundstrom |
| 6,131,441 A | | 10/2000 | Berube et al. |
| 6,463,791 B1 | | 10/2002 | Berube et al. |
| 6,467,811 B2 | | 10/2002 | Mitchell |
| 6,601,437 B2 | | 8/2003 | Gotowik |
| 7,056,064 B2 | | 6/2006 | Kamiyama et al. |
| 7,104,881 B1 | | 9/2006 | Hyslop |
| 7,669,899 B2 | | 3/2010 | Carson |
| 7,779,676 B2 | | 8/2010 | Carson |
| 2008/0121044 A1 | | 5/2008 | Carson |

FOREIGN PATENT DOCUMENTS

| | | |
|---|---|---|
| GB | 1140174 | 1/1969 |
| JP | 9310794 | 12/1997 |
| JP | 2003185549 | 7/2003 |
| WO | WO00/17619 A1 | 3/2000 |
| WO | WO2006/069446 A1 | 7/2006 |

OTHER PUBLICATIONS

International Search Report issued on May 10, 2011 in International Application No. PCT/CA2011/050121.
International Search Report issued on May 10, 2011 in International Application No. PCT/CA2011/050122.

* cited by examiner

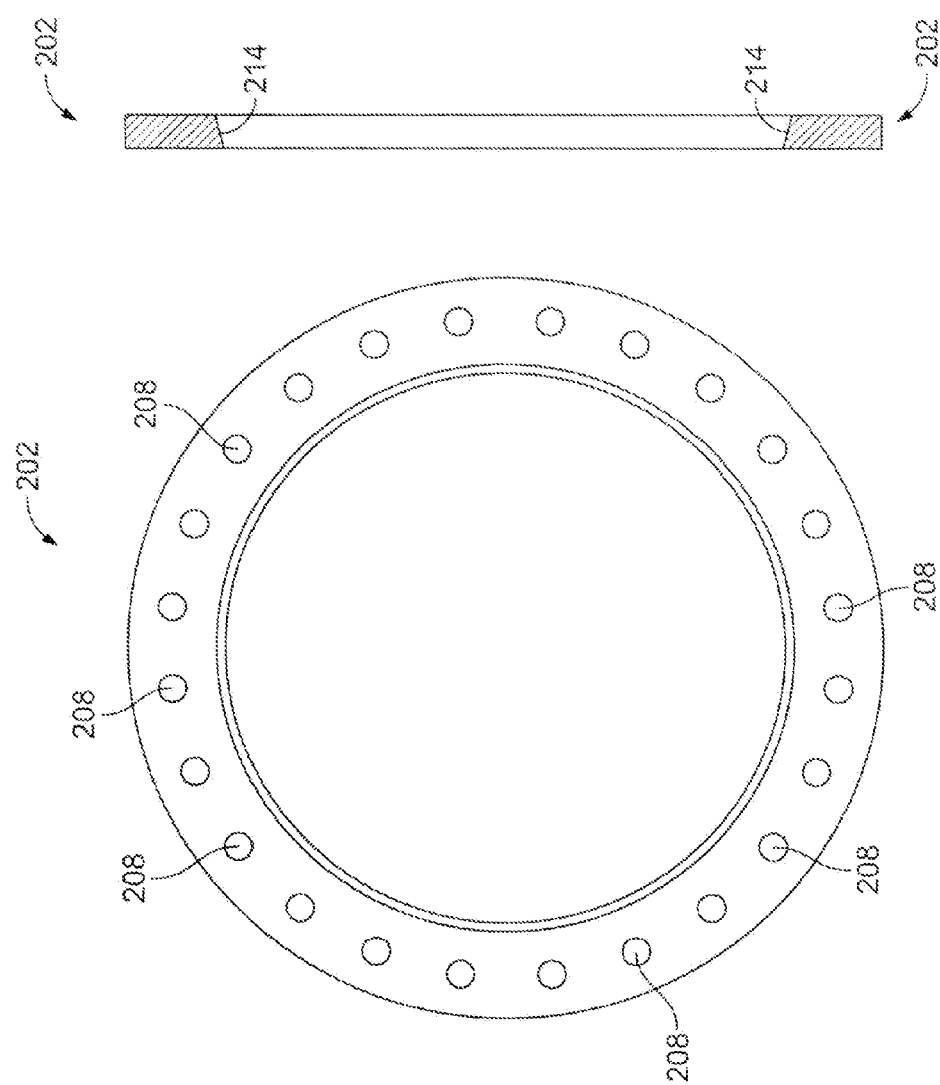

PIPE SEALING TOOL WITH EXTERNAL CLAMP

CROSS REFERENCE TO PRIOR APPLICATIONS

This application is a Continuation in Part of U.S. application Ser. No. 12/098,273 filed on Apr. 4, 2008, now U.S. Pat. No. 7,669,899, issued on Mar. 2, 2010, which is a Continuation of PCT application number PCT/CA2006/001641 filed on Oct. 6, 2006, which claims priority from U.S. Provisional application No. 60/723,915, filed Oct. 6, 2005. The entire contents of all the aforementioned related applications are incorporated herein by reference.

FIELD OF THE INVENTION

The present invention relates to an apparatus for sealing an open end of a pipe using an externally mounted clamp. Once sealed, the pipe can be subjected to pressurization for testing purposes etc.

BACKGROUND OF THE INVENTION

In chemical or petrochemical plants etc., it is often necessary to convey fluidic materials (e.g. liquids) from one location to another. The conveyance of such material normally includes equipment such as conduits or pipes, storage or reaction vessels etc., which are generally manufactured from metal. The joining of separate pieces of the conveying equipment is generally achieved by welding the necessary pieces together. For example, when joining adjacent ends of pipe together, it is common for each end to be provided with flanges, that are welded to each respective end, which are then bolted together to form a seal. Such flanges may also be provided on holding tanks and other such vessels so that such vessels can be connected to pipes or other vessels. Alternatively, the connections between lengths of pipe or other equipment may be welded directly together (i.e. butt welded) to form the seal. In either case, it will be appreciated that each welded joint or section must form a complete seal so as to prevent leakage of the materials being transported. This is particularly the case when handling potentially hazardous materials such as flammable or toxic liquids.

For reasons of safety, it is often necessary to periodically test the integrity of the welds used in joining the various pieces of equipment (such as pipes, vessels, flanges and the like) together.

The prior art provides various tools for conducting weld integrity tests on conduits. For example, U.S. Pat. Nos. 6,131,441 and 5,844,127 (the entire disclosures of which are incorporated herein by reference) teach weld testing tools that isolate a particular section of a pipe (such section including a weld) and subject the section to a high pressure fluid within a constrained annular space defined by the tool and the inner surface of the pipe. The pressure of the fluid within the annular space is monitored whereby any pressure drop signifies a leak in the weld.

U.S. Pat. No. 6,463,791 (the entire disclosure of which is incorporated herein by reference) teaches an apparatus for testing welds used to secure nozzles. As shown in FIG. 1 of this reference, the apparatus comprises a first seal plate that is placed on the inner surface of the vessel (for example) and a second seal plate that is secured to the outer, flange portion of the nozzle. In this manner, the nozzle volume is sealed and a pressurizing fluid is introduced therein. Once the volume is filled, the pressure is monitored as above and any leakage detected. Although this apparatus provides an accurate and efficient means of testing welds on nozzles, the size and weight of the apparatus makes it inconvenient for use on large nozzles.

Further, applicant's co-pending U.S. application Ser. No. 11/771,158 (publication number US 2008/0121044), provides tools for testing the integrity of welds on pipes and the like. The entire disclosure of such application is incorporated herein by reference.

There exists a need for more easily sealing a section of a long pipe for conducting the type of stress tests mentioned above. In addition, there exists a need for an apparatus that is capable of exerting axial stresses on welds during such testing so as to simulate a "worst case scenario". In particular, there is a need for an apparatus that can be easily mounted on an open end of a pipe so as to effectively seal the pipe opening and maintain such seal during high pressurization of the pipe. Such apparatus would not subject the pipe to any damage or otherwise cause weakness thereto.

SUMMARY OF THE INVENTION

In one aspect, the present invention generally provides an apparatus for sealing an open end of a pipe comprising:
   at least one generally annular shaped clamp for being frictionally secured to an outer surface of the pipe, adjacent and spaced from the open end thereof, the at least one clamp including a means for circumferentially gripping the outer surface of the pipe and preventing relative axial movement there-between;
   a sealing plate, adapted to cover the open end of the pipe, the sealing plate including a means for sealing the open end of the pipe;
   an urging means for urging the sealing plate axially towards the at least one clamp and against the open end of the pipe.

In another aspect, the invention provides an apparatus as above and wherein:
   the at least one clamp is comprised of at least two clamp sections, adapted to be joined together to form an annular body adapted to fit over the exterior surface of the pipe;
   each of the clamp sections including connecting flanges, provided at opposite ends of the sections, the flanges having a plurality of bolt holes;
   a plurality of second connecting elements for connecting flanges of adjacent clamp sections and for tightening each clamp section towards adjacent clamp sections for forming said annular shaped clamp.

In another aspect, the invention provides an apparatus as above and wherein the at least one clamp includes:
   a generally annular body having an inner diameter surface, at least a portion of the inner diameter surface including a first ramp extending from a first end to a second end of the annular body, the annular body having an inner diameter that is greater at the first end than at the second end;
   a generally annular gripper ring, coaxial with the annular body, the gripper ring being comprised of two or more sections, and having an inner surface with an inner diameter for engaging the outer surface of the pipe, and an outer surface, at least a portion of the outer surface of the gripper ring including a second ramp, the second ramp extending from a first end of the gripper ring to a second end of the gripper ring, the second ramp being oppositely directed to the first ramp, wherein the second end of the gripper ring is insertable within an annular space between the first end of the annular body and the outer wall of the pipe; and, a means for urging the gripper ring and the main body towards each other for forcing the second ramp under the first ramp, whereby, when the apparatus is in use, the first ramp bears against the second ramp wherein the inner diameter of the gripper ring is reduced resulting in a frictional engagement between the gripper ring and the outer surface of the pipe.

In another aspect, the invention provides a method for sealing a section of a pipe having an open end, the method comprising:

positioning at least one external clamp circumferentially over the outer surface of the pipe at a location spaced away from the open end, the at least one clamp being frictionally secured to the pipe surface so as to prevent relative axial movement between the clamp and the pipe;

positioning a sealing plate against the open end of the pipe, for covering the open end, the sealing plate including a groove adapted to receive the open end of the pipe;

connecting the sealing plate to at least one of the at least one clamps;

forcing the sealing plate axially towards the at least one clamp and forming a seal between the open end of the pipe and the sealing plate.

In another aspect, the invention provides a method as above and wherein the at least one clamp comprises a generally annular body formed of at least two sections, and wherein the step of securing the external clamp circumferentially over the outer surface of the pipe comprises connecting the at least two sections together and tightening the sections to cause frictional engagement between the at least one clamp and the pipe outer surface.

In another aspect, the invention provides a method as above and wherein the at least one clamp comprises: a generally annular body having an inner surface, a portion of the inner surface comprising a first ramp; and, a generally annular gripping ring formed of at least two sections, said gripper ring including an outer surface, a portion of the outer surface comprising a second ramp; the method comprising:

coaxially positioning the annular body and the gripper ring over a pipe such that the first and second ramps are oppositely oriented, wherein the second ramp of the gripper ring is insertable between the first ramp of the annular body and the outer wall of the pipe;

forcing the gripper ring against the annular body to cause radial compression of the gripper ring and frictional engagement of the gripper ring over the pipe outer surface; and, forming a sufficient clamping force between the gripper ring and the pipe surface to prevent relative axial movement between the at least one clamp and the pipe.

BRIEF DESCRIPTION OF THE DRAWINGS

These and other features of the invention will become more apparent in the following detailed description in which reference is made to the appended drawings wherein:

FIGS. 16 and 17 are front and side cross-sectional views of the squeeze ring shown in FIG. 15.

DETAILED DESCRIPTION OF THE INVENTION

Throughout the description of the invention the following terms will be assumed to have the following associated meanings:

"Vessel"—will be understood to mean any equipment or apparatus to which a nozzle is attached. As such, the term "vessel" will include vessels per se, pipes, drums, and any other similar equipment. It will be understood that the term "vessel" is used herein simply as a convenient way to encompass all such equipment or apparatus.

"Annular"—this term is used to describe a body having at least one outer diameter and at least one inner diameter. Thus, an "annular tube" will be assumed to be a hollow tube with an inner and outer diameter. An "annular disc" will be assumed to be an object having an outer diameter and a central aperture thereby providing an inner diameter.

"Axial"—this term will be used to describe a direction taken along the longitudinal axis of a pipe or conduit. Thus, "axial force" or "axial stress" will be understood as being a force applied in a direction parallel to the longitudinal axis of the conduit. Similarly, the term "axially extending" will be understood to mean extending in a direction parallel to the longitudinal axis of the pipe.

"Proximal" and "distal"—these terms will be used to describe the positions of various components of the invention once positioned over a pipe having an open end. The term "proximal" will be used to describe a position closer to the open end of the pipe. The term "distal" will be used to describe a position away from the open end of the pipe.

Figure 1:
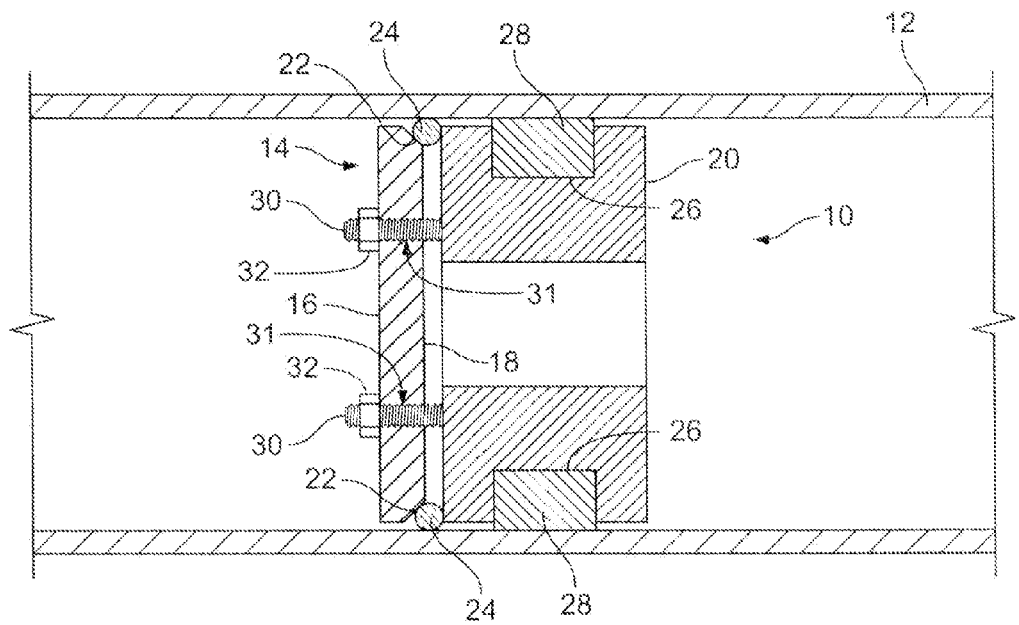
FIG. 1 is a cross sectional view of one embodiment of the apparatus of the present invention.

FIG. 1 illustrates one aspect of the invention wherein an internal sealing apparatus for a pipe is shown. The sealing apparatus 10 is preferably sized to fit within the lumen of a pipe (or tube) 12. The apparatus 10 comprises a sealing plate 14 having a diameter slightly less than the internal diameter of the pipe 12. The plate includes a first face 16 and a second face 18, wherein the second face is adjacent a clamp 20. The second face 18 of the sealing plate 14 is provided with beveled edge 22 for accommodating an O-ring 24 or other such resilient sealing means.

The clamp 20 generally comprises an annular ring having an outer diameter sized to fit within the pipe 12. An annular shape for the clamp 20 is preferred to minimize its weight. However, the clamp 20 may also comprise a solid body. As will be understood by persons skilled in the art having reviewed the present disclosure, the outer diameter of the clamp 20 is preferably slightly less than the internal diameter of the pipe 12 so as to permit axial placement of the clamp 20. The clamp 20 is provided with one or more recesses or pockets 26 into which are placed magnets 28. Preferably, the magnets 28 comprise electromagnets that can be activated when desired.

The magnets 28 provided on the clamp 20 are designed to magnetically attract the wall of the pipe 12, which, as is commonly known in the art, is formed from a ferrous metal. The magnets 28 are designed to form a strong clamping force with the interior wall of the pipe 12 and, thereby, to anchor the clamp in a fixed axial position within the pipe 12. In a preferred embodiment, at least two or more magnets 28 are provided on the clamp 20 with such magnets being placed circumferentially around the annular clamp 20. Such an arrangement will serve to evenly secure the clamp 20 within the pipe 12. Although the present description refers to a number of magnets being provided on the clamp, in other embodiments, one or more shaped magnets can be provided so as to achieve the desired clamping force.

The clamp 20 is releasably secured to the sealing plate 14. In one embodiment, the clamp is provided with one or more, and preferably a plurality, of bolts 30 adapted to be inserted into holes 31 provided on the sealing plate. Nuts 32 cooperate with the bolts 30 to secure the sealing plate 14 to the clamp 20. It will be understood that a sealing means (not shown) may be provided between the bolts 30 and the nuts 32 and/or holes 31 in the sealing plate 14 to provide a seal and, thereby, prevent leaks through the holes 31.

Figures 2, 3:
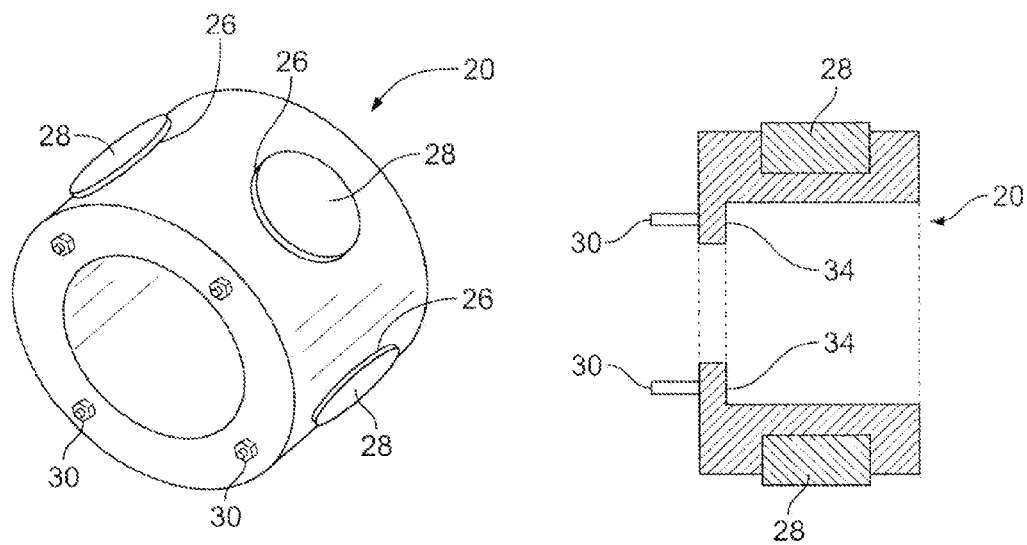
FIG. 2 is a perspective view of the clamp of the apparatus of FIG. 1.
FIG. 3 is a cross sectional elevation of another embodiment of the clamp of FIG. 1.

FIG. 2 illustrates an embodiment of the clamp 20 illustrating the circumferential placement of the magnets 28 and the bolts 30. As mentioned above, although the clamp 20 is shown in FIG. 2 in the form of an annulus, it may also comprise a solid body. In either embodiment case, in order to reduce the weight of the clamp 20, it may be formed of a light material such as aluminum. The sealing plate 14 may also be formed of aluminum. However, it will be understood that the choice of material for the clamp 20 and/or the sealing plate 14 may be chosen from a variety of others.

As can be seen in FIG. 1, upon tightening of the nuts 32, the sealing plate 14 is forced against the opposing face of the clamp 20. In the course of this process, the resilient seal 24 (i.e. the O-ring) is elastically deformed. The bevel 22 provided on the sealing plate 14 causes such deformation to expand radially outwardly.

In use, the apparatus 10 is first inserted within a pipe 12. The apparatus 10 is axially positioned in a desired location within the pipe 12. It will be understood that the apparatus may be preassembled prior to the positioning step. That is, the sealing plate 14 may be loosely connected to the clamp 20. Alternatively, the sealing plate 14 and clamp 20 may be inserted separately within the pipe 12. Once the apparatus 10 is positioned at the desired location, the sealing plate 14 is connected to the clamp 20 (if not already) by first inserting the bolts 30 through the holes 31 and attaching the cooperating nuts 32 thereto. As mentioned above, any type of seal (such as washers, packing etc.) may also be provided so as to seal the holes 31. Tightening of the nuts 32 forces the sealing plate 14 against the clamp 20 and, as discussed above, results in the outward radial deformation of the seal 24. The seal 24 is thereby forced against the inner wall of the pipe 12 resulting in a pressure resistant seal there-between.

Either before the tightening of the nuts 32 or after, the magnets 28 provided on the clamp 20 are activated resulting in a strong attraction force being formed between the magnets 28 and the wall of the pipe 12. It will be understood that the magnets used in the invention are chosen so as to provide the required clamping force to prevent axial movement of the clamp 20 within the pipe 12. As mentioned above, the magnets 28 preferably comprise electro magnets. In such case, one or more power supply units (not shown) will be connected to the magnets 28 in order to activate same.

Once the clamp 20 is secured to the pipe 12 and the sealing plate 14 is secured and sealed against the clamp 20, the lumen of the pipe 12 facing the first face 16 of the sealing plate may then be pressurized with a gas or liquid without leakage beyond the sealing plate 14.

FIG. 3 illustrates another embodiment of the clamp 20 having an annular structure wherein an inwardly extending flange 34 is provided to accommodate the bolts 30. The bolts may be permanently attached to the flange 34 (or the face of the clamp 20) by means of welds etc., may be integrally formed therewith, or may extend there-through and be secured with nuts (not shown).

Figure 4A:
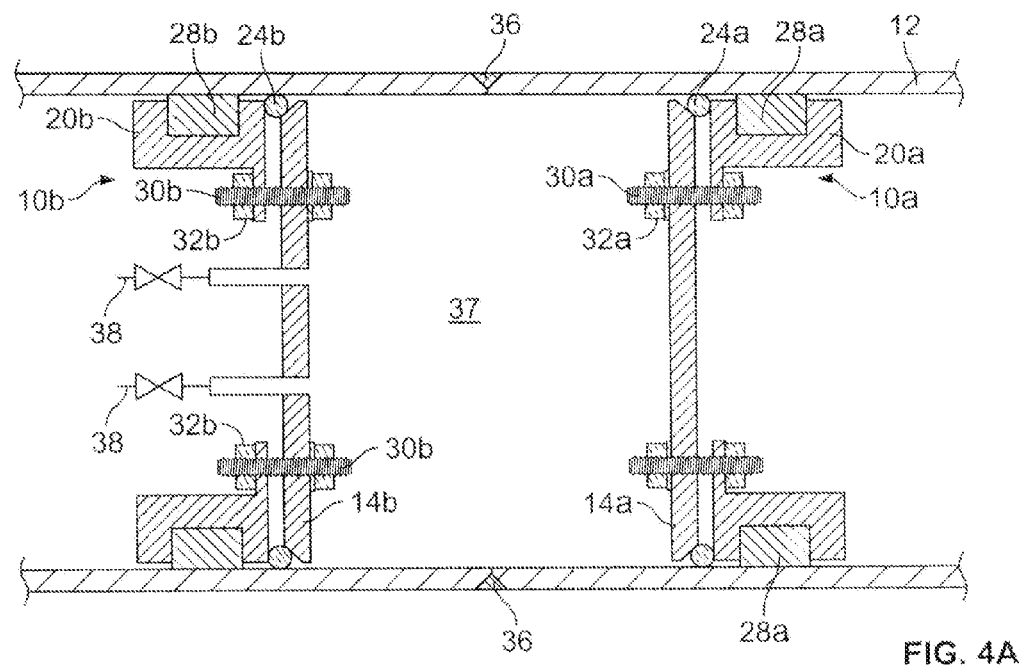
FIGS. 4, 4b, 5 and 6 are cross sectional views of further embodiments of the present invention.

FIG. 4 illustrates the use of the sealing apparatus of the invention for the dual purposes of sealing and testing a pipe. As shown, a pair of apparatuses 10a and 10b is provided within a pipe 12 and positioned on opposite sides of a weld 36, the integrity of which is to be tested. Apparatus 10a is essentially identical to that shown in FIG. 1 and as described above. As discussed above, apparatus 10a includes a sealing plate 14a joined to a clamps 20a by means of nuts and bolts 32a and 30a, respectively. Clamp 20a includes at least one magnet 28a, and preferably two or more magnets generally circumferentially equidistantly spaced. A seal is formed between the apparatus 10a and the inner wall of the pipe 12 by means of a resilient seal 24a, which may comprise an O-ring. The magnets 28a are activated to secure the clamp to the pipe 12 at the desired location. As explained above, such securing results when the attraction force of the magnets creates a tight friction engagement between the magnet and the pipe 12 surface.

Apparatus 10b of FIG. 4 is similar to the apparatus 10a described above and similar elements are identified with similar reference numerals but with the letter "b" added for clarity. As shown, apparatus 10b is positioned within the pipe 12 on the opposite side of the weld 36 from apparatus 10a. In this manner, the two apparatuses 10a and 10b combine to seal off a section of the pipe 12 thereby forming a sealed space 37. In the case of apparatus 10b, the sealing plate 14b is provided with at least one fluid port 38 through which the sealed space 37 can be filled with a pressurizing fluid (i.e. a liquid or a gas). In a preferred embodiment, as illustrated in FIG. 4, two ports 38 are provided so that one is used to fill the space 37, for example with water, while the other is used to vent any air there-within. It will be appreciated that any number of ports 38 can be provided. One or more of the ports 38 is preferably connected to a pressure gauge or other similar device (not shown) to monitor the pressure created within the space 37. As will be known to persons skilled in the art, a test of the weld 36 involves applying a constant high pressure to the interior of the pipe and monitoring such pressure over a period of time. Any drop in pressure signifies a leak in the weld.

In use, the system illustrated in FIG. 4 first involves placing and securing the apparatuses 10a and 10b in the manner described above. The sealed space 37 is then filled with a pressurizing fluid and, as described above, the pressure is monitored.

Apart from the testing function provided by the system shown in FIG. 4, a further feature of the invention will also be understood. Specifically, by creating a sealed pressurized space 37 between the apparatuses 10*a* and 10*b*, it will be seen that the pressure applied to the weld 36 also provided a separating force between the two apparatuses. However, since the apparatuses are secured, or clamped, to the interior of the pipe, such separating force also serves to apply an axial force against the weld 36. In this way, the system shown in FIG. 4 applies both radial and axial forces against the weld 36 thereby more accurately simulating a "worst case" scenario for conducting the weld test. It will be understood that such simulated stresses will provide more accurate results for the test.

Figure 4B:
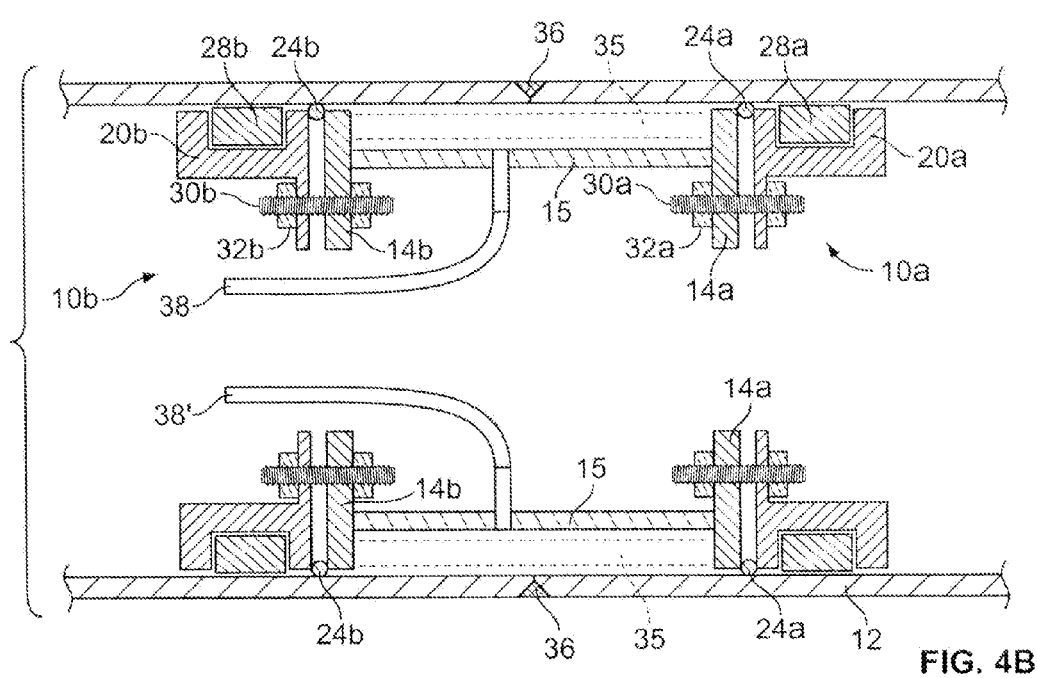

FIG. 4*b* illustrates a variation of the assembly shown in FIG. 4. In the case of FIG. 4*b*, the apparatus 10*a* and 10*b* are essentially the same as that discussed above in that each includes at least one clamp 20*a* and 20*b*, respectively, which are provided within a pipe 12. Clamps 20*a* and 20*b* include magnets 28*a* and 28*b* arranged in the same manner as described above. The main difference between the assembly shown in FIGS. 4 and 4*b* lies in the sealing plates 14*a* and 14*b*. In the case of FIG. 4*b*, the sealing plates 14*a* and 14*b* are general of an annular disc shape, wherein each includes a generally central opening. As will be appreciated by persons skilled in the art, this allows the plates 14*a* and 14*b* to be of much reduced weight thereby facilitating use of the assembly in large diameter pipes.

In addition, the sealing plates 14*a* and 14*b* of FIG. 4*b* are joined together by a tube 15 extending between each plate. The tube 15 includes an inner diameter that is preferably larger than the diameters of the openings provided in plates 14*a* and 14*b*. Further, the outer diameter of the tube 15 is less than the inner diameter of the pipe 12. When the assembly of apparatuses 10*a* and 10*b* is installed within a pipe 12, a sealed annular space 35 is thus formed between the two seals 24*a* and 24*b*, the outer surface of the tube 15 and the inner surface of the pipe 12. The tube 15 is also preferably provided with one or more ports as discussed above. In FIG. 4*b*, two ports, 38 and 38' are shown. The ports are used to fill and/or vent the annular space 35 in the same manner as described above. As can be seen, the volume of the space 35 is minimized due to the presence of the tube 15 and, therefore, the volume of fluid required to fill the space is minimized.

Figure 5:
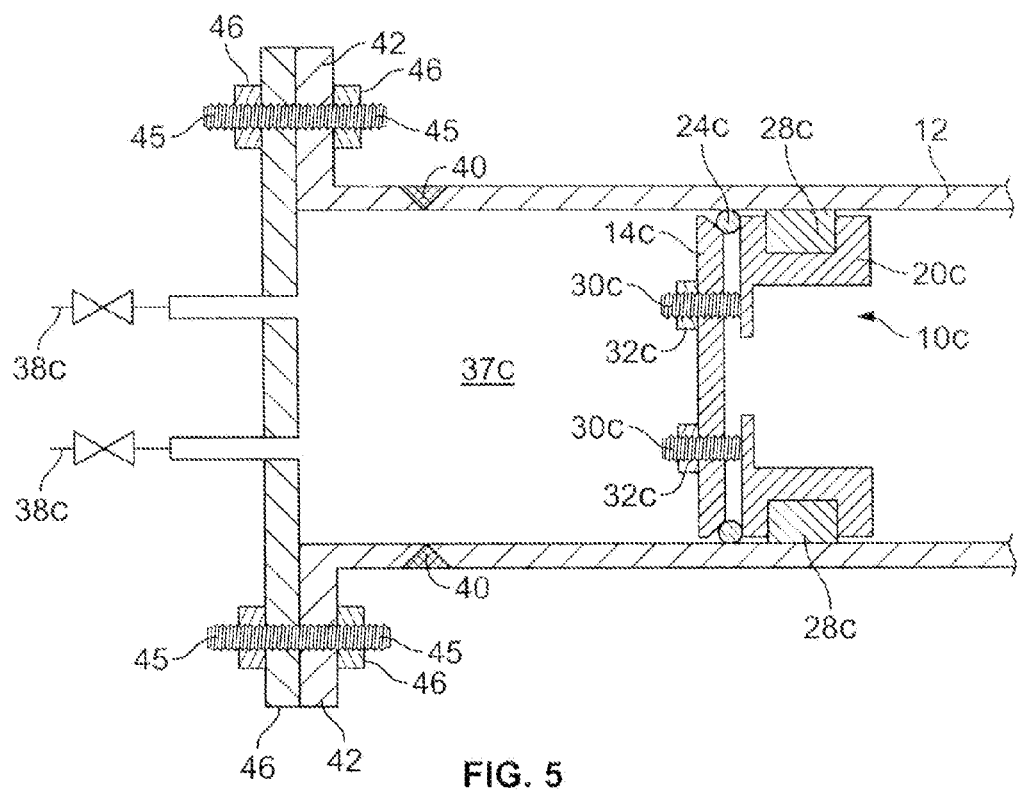

FIG. 5 illustrates the use of a sealing apparatus of the invention in a manner similar to that shown in FIG. 4. In the example illustrated in FIG. 5, a weld 40 is used to secure a flange 42 to the end of a pipe 12. It will be understood that pipe 12 may be a pipe used for conveying as described above or may be the conduit portion of a nozzle provided on a vessel and the like. In this example, an apparatus 10*c* essentially the same as that shown in FIG. 1 is used to seal the pipe 12 on one side of a weld 40 opposite to the flange 42. In FIG. 5, the elements of apparatus 10*c* that are similar to the apparatus of FIG. 1 are shown with the same reference numerals but with the letter "c" added for clarity. The method of positioning and sealing the apparatus 10*c* is the same as described above. In this example, the open end of the flange 42 is sealed with a plate 44. The plate 44 is formed with a series of circumferentially spaced bolt holes that correspond with bolt holes that are normally present on the face of the flange 42. Once the bolt holes of the plate 44 are aligned with those of the flange 42, bolts 45 are inserted there-through and secured with nuts 46. As shown in FIG. 5, nuts may be provided on both ends of the bolts 45. It will be understood that the bolts 45 may have one end with an integral or welded bolt head thereby avoiding the need for nuts on both ends thereof. It will be understood that any needed seal such as a gasket and the like (not shown) may be provided at the junction of the faces of the flange 42 and plate 44.

The plate 44 is provided with at least one port 38*c* in a manner similar to that described above with reference to FIG. 4. The ports 38*c* serve to fill the sealed space 37*c* between the flange 42 and the sealing apparatus 10*c*. As shown in FIG. 5, the sealed space 37*c* includes the weld 40 that secures the flange 42 to the end of the pipe 12.

In using the system shown in FIG. 5, the sealing apparatus 10*c* is first installed within the pipe 12 in the manner described above. The plate 44 is then installed at the outer face of the flange 42. The plate 44 is secured to the flange 42 so as to form a pressure tight seal there-between. As mentioned above, any needed gaskets etc. can be used for this purpose. Once the plate 44 and the apparatus 10*c* are secured and clamped, a pressurized fluid is injected through one or more of the ports 38*c* so as to pressurize the space 37*c*. As discussed above with respect to FIG. 4, the apparatus shown in FIG. 5 also serves to apply both a radial as well as axial stress on the weld 40.

Figure 6:
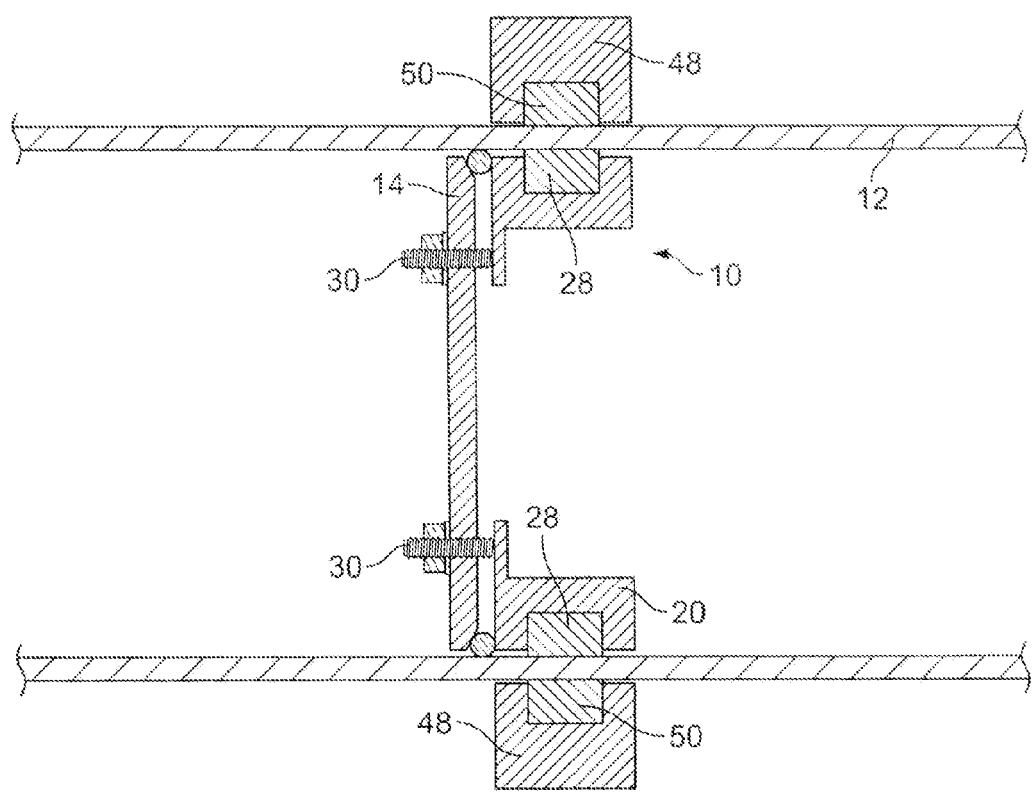

FIG. 6 illustrates a further embodiment of the invention wherein the apparatus 10 of FIG. 1 is provided within a pipe 12. However, in this example, the exterior surface of the pipe is provided with a retaining collar 48 comprising a generally annular body having an inner and outer diameter. The inner diameter of the collar 48 is provided with a number of circumferentially spaced magnets 50 designed to abut the outer surface of the pipe 12. The magnets 50 of the collar 48 are arranged so as to overlap magnets 28 provided on the clamp 20 when the collar 48 is positioned in the same axial position as the clamp 20. The magnets 50 of the collar 48 may be provided with a different power source or the same as that powering magnets 28 of the clamp 20.

With the embodiment of FIG. 6, it will be understood that the combination of the magnetic attraction forces of both sets of magnets 28 and 50 will serve to provide an enhanced clamping force for the apparatus. In other words, the collar 48 serves to reinforce the clamp 20. In a further embodiment, the polarity of the magnets 28 and 50 can be adjusted so as to form a magnetic attraction force there-between. In this manner, the combination of the clamp 20 and collar 50 can be used with non-ferrous pipes as well such as pipes made from aluminum or stainless steel etc. In such case, it will be understood that the magnets 28 and 50 will be provided with a pipe contact surface having a sufficient coefficient of friction to prevent the apparatus from sliding over the pipe 12. Similarly, even in the case of ferrous pipes, such a friction surface may be provided on the magnets 28 and/or 50.

It will be understood that the collar 48 may be used with any of the clamps discussed above.

Figure 7:
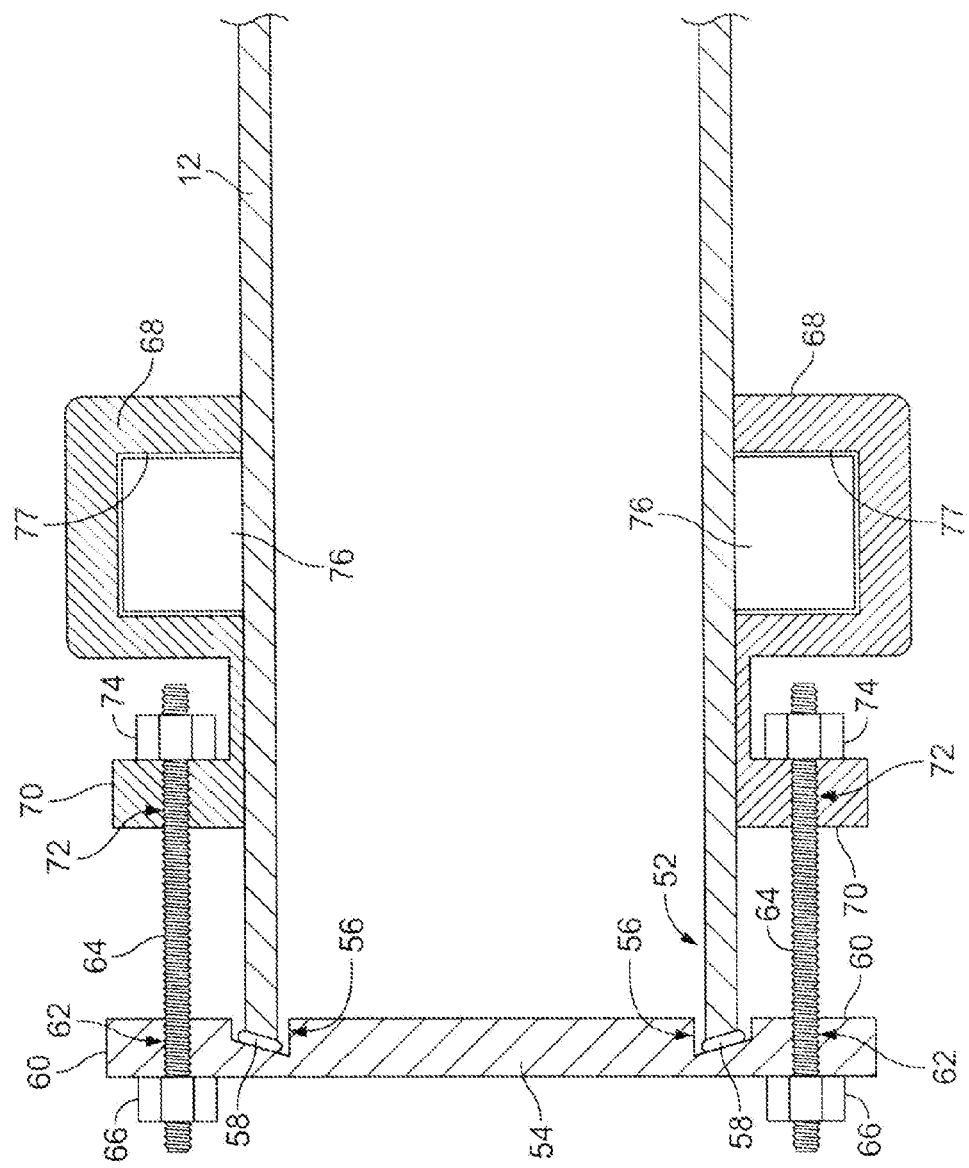
FIGS. 7 to 9 are cross sectional views of an embodiment of the invention having an external clamp.

FIG. 7 illustrates a further embodiment of the invention for sealing an end of a pipe. As shown a pipe 12 having an open end 52 is provided with an end plate 54 adapted to close the open end. The end plate 54 is preferably provided with a circular race 56 for receiving therein the end 52 of the pipe 12. As will be understood, the width of the race 56 will generally be sized to accommodate the thickness of the pipe 12. The race 56 is also preferably provided with a resilient sealing member 58 so as to form a seal between the plate 54 and the end 52 of the pipe 12.

The plate 54 is provided with diameter greater than that of the pipe 12 so as to form a radially extending anchoring flange 60. In another embodiment, the plate 54 may have a diameter closer to that of the pipe 12 but be provided with radially extending arms to form an equivalent to the anchoring flange 60.

The anchoring flange 60 is provided with a plurality of circumferentially spaced bolt holes 62 through which are passed bolts 64. On the face of plate 54 opposite the pipe end 52, the bolts 64 are secured with nuts 66. The opposite ends of the bolts 64 are secured to a clamping collar 68 comprising a generally annular body circumferentially extending around the external surface of the pipe 12. The clamping collar 68 includes a radially outwardly extending flange 70 facing the plate 54. The flange 70 is provided with a plurality of bolt holes 72 corresponding to the bolt holes 62 on the plate 54 and adapted to receive the opposite ends of the bolts 64. The flange 70 is secured to the bolts 64 with nuts 74. In another embodiment, it will be understood that the bolts 64 can be welded or formed with either the plate 54 or the flange 70 thereby requiring only one set of nuts 66 or 74.

The clamping collar 68 is provided with one or more magnets 76 circumferentially around the inner diameter thereof and directed towards the outer surface of the pipe 12. The magnets 76 are provided within recesses or pockets 77 provided in the body of the collar 68. As discussed above, the magnets 76 may preferably comprise electro magnets coupled to one or more power sources (not shown). In a preferred embodiment, a plurality of magnets 76 are provided generally equidistantly around the circumference of the pipe 12 so as to evenly distribute the associated clamping forces.

In another embodiment, the clamping collar 68 may be provided in one or more sections.

In operation, the clamping collar 68 is mounted on the outer surface of the pipe 12. At this time, the magnets 76 may be activated so as to form a magnetic attraction force between the magnets and ferrous pipe 12. The strength of the magnets will be chosen so as to form an adequate clamping force between the collar 68 and the pipe 12 so as to prevent relative axial movement there-between. As mentioned above, the magnets 76 may be provided with a friction enhancing surface to assist in preventing relative axial movement between the collar 68 and the pipe 12.

Once the clamping collar 68 is secured to the pipe 12 surface, the plate 54 is then mounted against the open end 52. The plate is mounted so that the end of the pipe 12 is received within the race 56. At this time, the bolts 64 are positioned and secured with bolts 66 and 74. As will be understood, tightening of the bolts results in the plate being forced against the open end 52 of the pipe 12 and, thereby, the end of the pipe being sealed.

Once the end of the pipe 12 is sealed with the plate 54, the interior of the pipe can then be pressurized to test, for example, any welds provided on the pipe.

Figure 8:
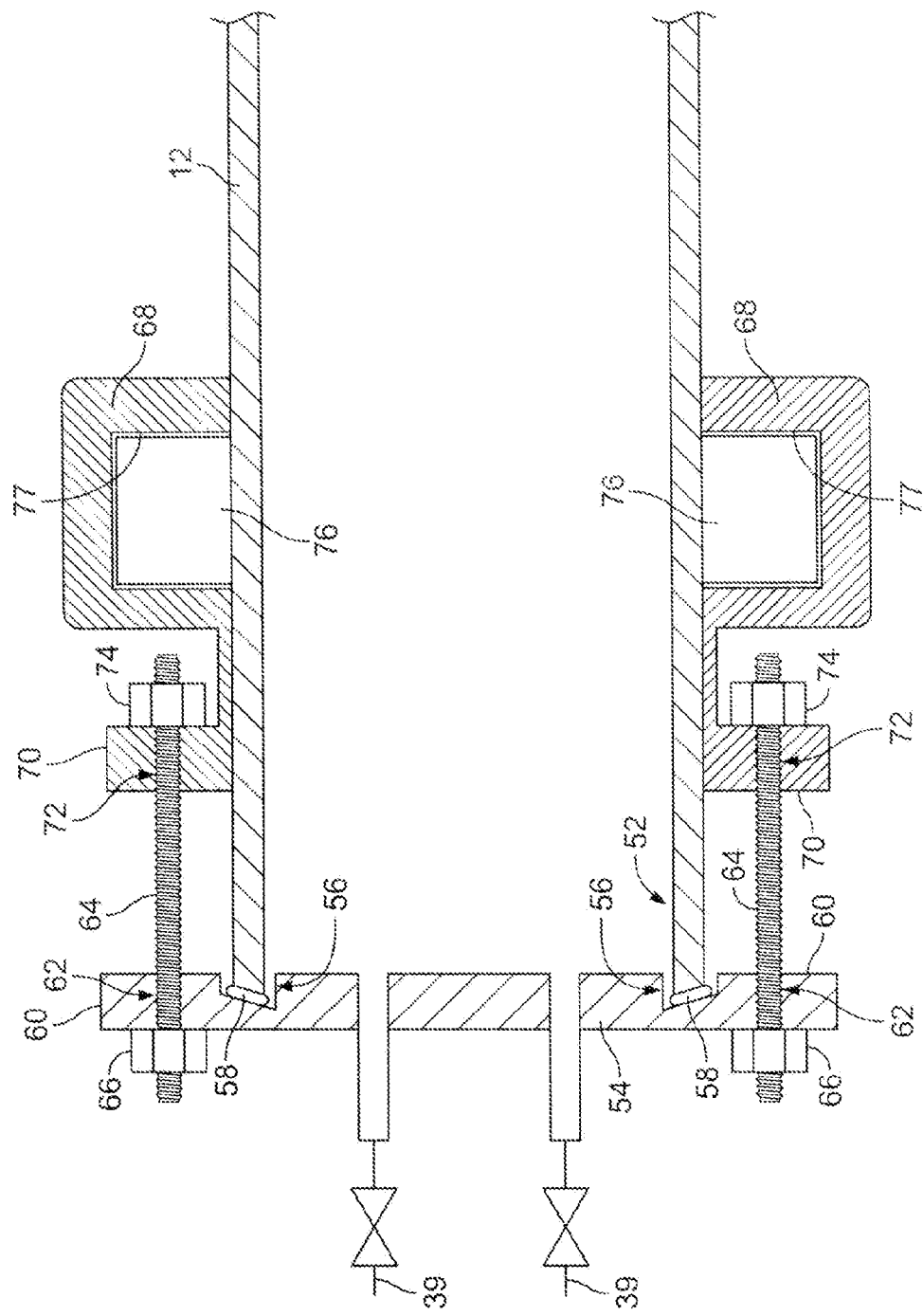

In a further embodiment, as shown in FIG. 8, the plate illustrated in FIG. 7 can be provided with ports 39, which are similar to those shown as element numbers 38c in FIG. 5. As will be understood, the apparatus shown in FIG. 8 can be used to pressurize the interior of the pipe 12 so as to apply a radial and axial stress therein. In this manner, a weld on the pipe, downstream of the end 52 may be tested with the apparatus of FIG. 8 without the need to localize the testing apparatus at the region of the weld. It will also be understood that the apparatus of FIG. 8 can used in combination with, for example, the sealing apparatus 10 or 10c of FIG. 1 or 5 so as to isolate a segment of a pipe for testing purposes.

Figure 9:
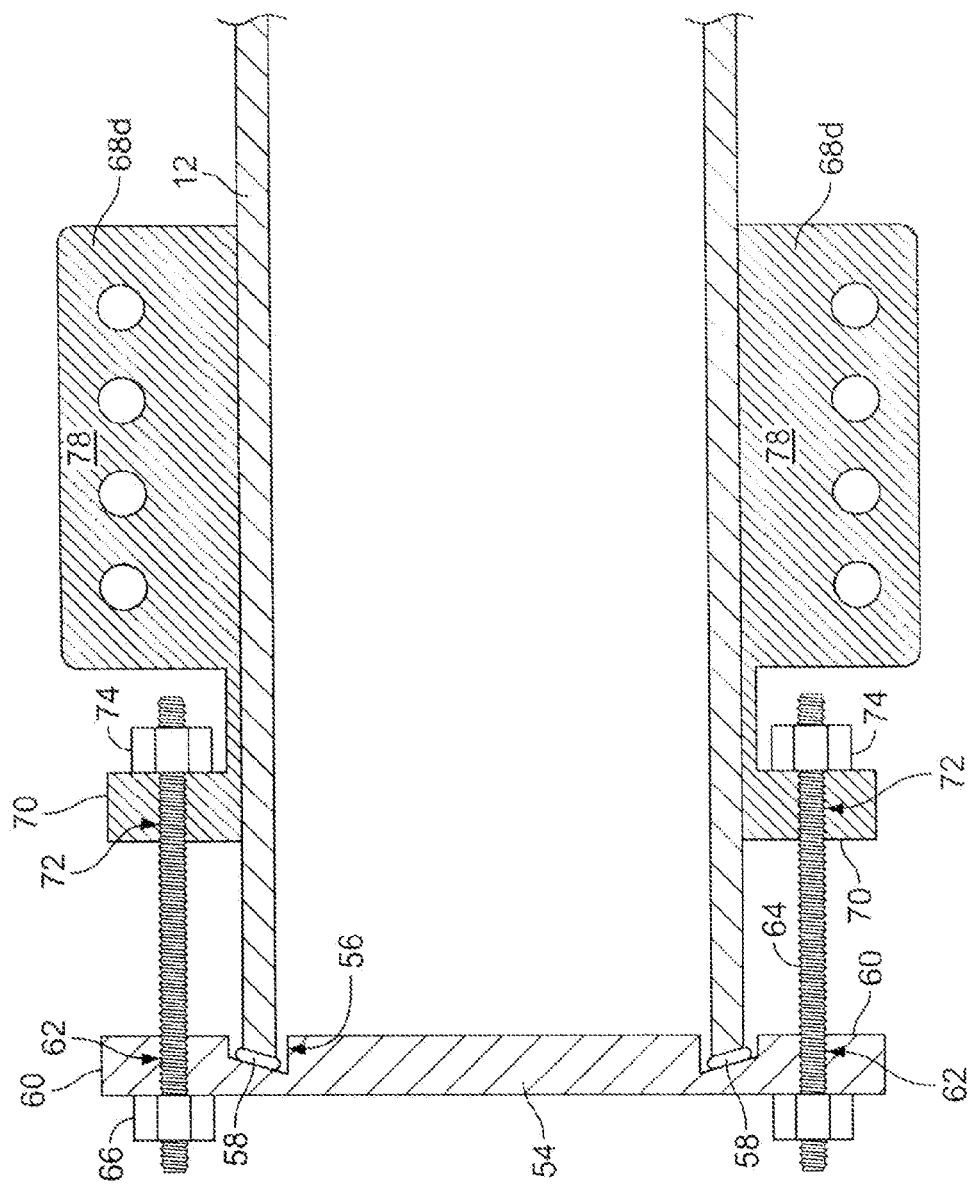

A further embodiment of the apparatus of FIGS. 7 and 8 is illustrated in FIG. 9 wherein like elements are indicated with like reference numerals. Elements that are similar but not identical are indicated with like reference numerals but with the letter "d" added for clarity. As can be seen, in the embodiment of FIG. 9, the clamping collar 68d does not include any magnets for engaging the wall of the pipe 12. In the example of FIG. 9, the clamping collar 68d is provided in two or more sections that are joined together by means of cooperating radially extending flanges 78. Each of the flanges 78 are provided with bolt holes 80 through which bolts (not shown) are passed. Nuts (not shown) cooperate with the bolts to join opposing flanges 78 together thereby securing the flanges together. The clamping collar 68d of FIG. 9 is sized so that tightening of the flanges 78 to each other forms a strong frictional engagement with the outer surface of the pipe 12.

As discussed above with respect to other aspects of the invention, once the clamping collar, or clamp 68d is secured to the outer surface of the pipe, a sealing plate 54 may be secured to open end of the pipe 12. In the same manner as described above, the sealing plate 54 is secured to the clamp 68d by means of an urging means. In the embodiment shown, such urging means is provided by a combination of nuts and bolts that join the clamp 68d to the sealing plate. Tightening of such nuts urges the sealing plate 54 towards the clamp 68d. In view of the frictional engagement of the clamp 68d to the outer surface of the pipe 12, it is prevented from movement with respect to the pipe 12. In particular, relative axial movement of the clamp 68d and the pipe 12 is prevented. In the result, the sealing plate 54 is pressed against the open end of the pipe 12 and, thereby seals such open end in the same manner as described above.

Figure 10:
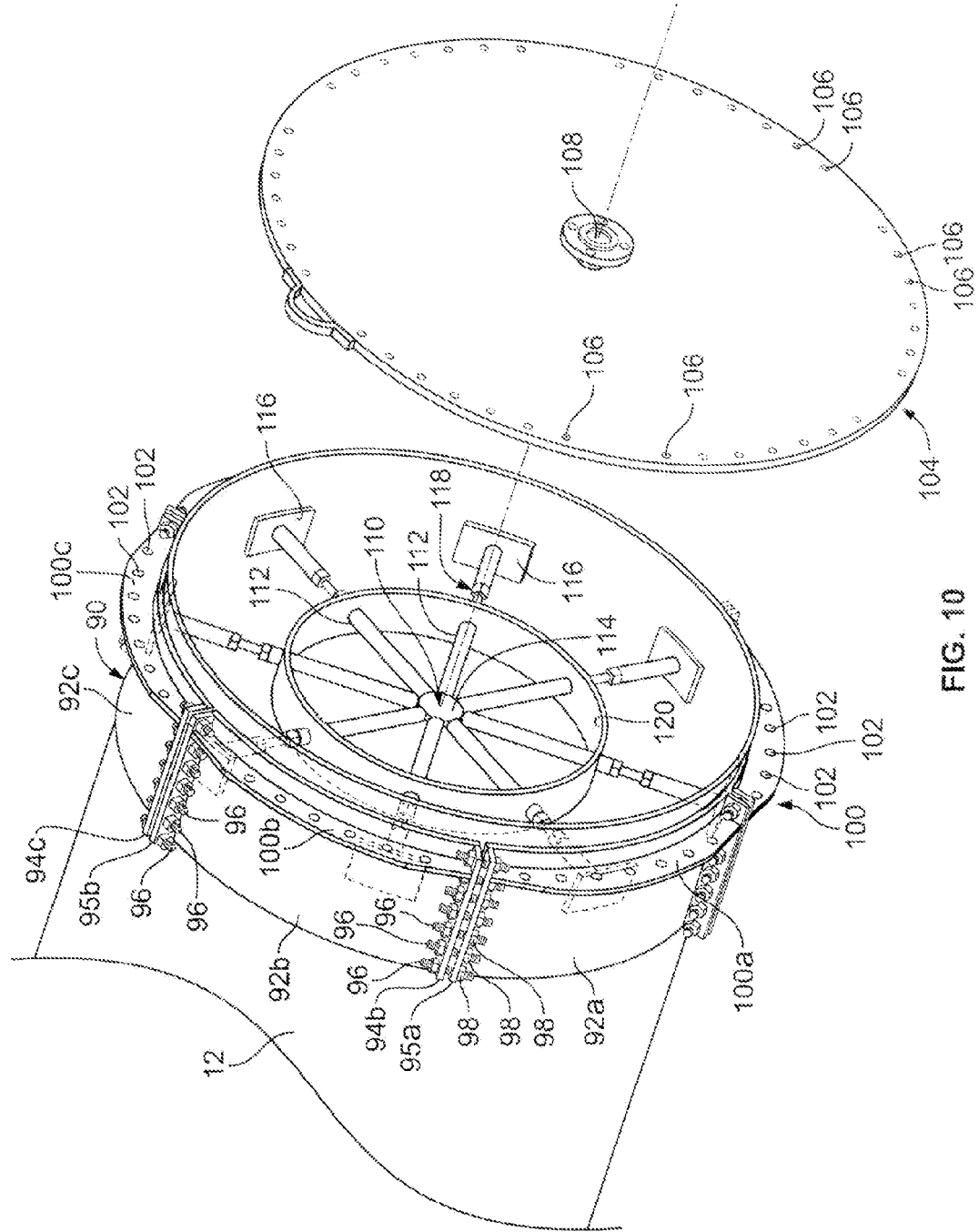
FIG. 10 is a perspective view of another aspect of the invention shown in FIG. 9.

FIG. 10 illustrates a further aspect of the invention wherein a clamp is provided on the outer surface of a pipe, adjacent an open end of thereof, and a sealing plate (or other similar means) is provided to seal the open end of the pipe. In the embodiment shown in FIG. 10, the clamp 90 is similar in design to that shown in FIG. 9. However, as illustrated, the clamp 90 is formed of a plurality of sections 92a, 92b, 92c etc., which are adapted to be joined together to form a circumferential collar (i.e. the clamp 90) around the surface of a pipe 12. In FIG. 10, only sections 92a, 92b, 92c are shown. However, it will be understood that the clamp 90 shown in FIG. 10 includes other sections that extend on the opposite side of the pipe shown therein. It will also be understood that the number of sections forming the clamp 90 will depend on the size (i.e. length) of each section and the outer diameter of the pipe. For example, for small diameter pipes, only two sections may be needed (as shown in FIG. 9). However, for larger diameter pipes such as that shown in FIG. 10, the clamp 90 may be provided in several sections.

The sections forming the clamp 90 are provided with a pair of radially extending, longitudinal "connecting" flanges, one at each end of the clamp section. The term "radially extending, longitudinal" refers to the orientation of the flanges when the clamp 90 is in use on a pipe. The term "connecting" refers to the use of such flanges in connecting adjacent clamp sections together. As shown and described further below, the connecting flanges extend radially outwardly away from the pipe 12. Further, these flanges extend in a direction parallel with the longitudinal axis of the pipe 12. As shown in FIG. 10, clamp section 92b is shown with flanges 94b and 95b at the opposite ends thereof. Each of the connecting flanges extend in the same direction, perpendicularly to the body of the respective section. When the clamp 90 is assembled, as shown in FIG. 10, the flanges extend radially outwardly, away from the pipe, and extend in a direction generally parallel to the longitudinal axis of the pipe 12. As shown, when the clamp 90 is in the assembled state over a pipe 12, the flanges of each adjacent section of the clamp 90 abut each other. For example, as shown in FIG. 10, the flange 94b of section 92b is positioned in facing arrangement against flange 95a of section 92a. Similarly flange 95b is positioned in facing arrangement against flange 94c of section 92c. Flanges of other sections of the clamp 90 would be similarly arranged in a facing, or opposing manner. The opposing flanges of adjacent clamp sections are joined together using a number of bolts 96 (or "clamping bolts") that extend through bolt holes provided in the flanges. The flanges are then secured together by nuts 98 that cooperate with the bolts 96. In this manner, the opposing flanges of each clamp section are secured together, thereby forming the clamp 90. As the flanges of the clamp sections are urged together, the internal diameter of the clamp 90 is gradually reduced. Thus, by appropriately sizing the clamp 90 with respect to the outer diameter of the pipe 12, the clamp 90 can be secured to the pipe 12 outer surface, whereby relative movement between the pipe 12 and the clamp 90 is prevented. It will be understood that in order for such tight fit to occur, there should be provided some clearance between the clamp sections to allow a reduction in the inner diameter of the clamp 90 once positioned over a pipe 12. It will also be understood that by providing bolts 96 of sufficient length, one clamp 90 may be used for a range of outer diameters of pipes.

The sections forming the clamp 90 are also each provided with a radially extending, circumferential "sealing" flange section 100, extending along the length of each section and extending between the opposing connecting flanges. The term "radially extending, circumferential" refers to the orientation of the sealing flange, wherein, when the clamp 90 is assembled and in use, each flange section extends radially away from the pipe and perpendicular to the longitudinal axis of the pipe 12. The term "sealing" refers to the use of such flange section in securing a sealing plate (described below) against the open end of the pipe 12. As shown in FIG. 10, clamp sections 92a, 92b and 92c are provided, respectively, with sealing flange sections 100a, 100b and 100c. For convenience, the circumferential sealing flange formed by the respective sections will be identified with element number 100. In the assembled state of the clamp 90, the sealing flanges sections of the clamp sections combine to form a radially extending sealing flange 100 on the clamp, wherein such flange extends radially outwardly away from the pipe 12 and transverse to the longitudinal axis of the pipe 12. In this manner, when the clamp 90 is assembled on a pipe, the sealing flange sections of each clamp section align over the circumference of the pipe 12 to form a generally unitary flange 100. The sealing flange sections of the clamp sections are also provided with a number of bolt holes 102, which are discussed further below.

In order to seal the open end of the pipe 12, a sealing plate 104 is provided. The sealing plate 104 is preferably sized to have a diameter that is greater than the diameter of the pipe 12. Along the outer edge of the sealing plate are provided a number of bolt holes 106 that are positioned to cooperate with the bolt holes 102 provided in the sealing flange 100. As discussed above with respect to other embodiments, in use, once the clamp 90 has been secured to the outer surface of the pipe 12, the sealing plate 104 is then secured to the clamp 90. In this process, the sealing plate is positioned against the opening of the pipe 12 and a plurality of bolts (not shown) are passed through aligned bolt holes, 102 and 106, of the sealing plate 104 and the sealing flange 100. Such bolts may be referred to herein as "sealing bolts". As discussed above, the sealing plate 104 is preferably provided with a sealing means for sealingly engaging the open end of the pipe 12. In one aspect, the sealing plate may be provided with a groove or race (not shown in FIG. 10 but shown by example in FIGS. 7-9) and an appropriate sealing member for engaging and sealing the open end of the pipe. In operation, the sealing plate 104 is brought against the open end of the pipe 12 by, for example, causing the end of the pipe to be received in the groove provided on the sealing plate 104. The bolt holes 106 of the sealing plate 104 are then aligned with bolt holes 102 of the sealing flange 100. The sealing bolts (not shown) are then passed through the aligned bolt holes 102 and 106 and secured with nuts (not shown). As described above, tightening of the nuts results in the sealing plate 104 being urged towards the clamp 90 and, due to the immobilization of the clamp 90 on the pipe 12, the sealing plate 104 is thereby urged against the end of the pipe 12. The nuts are tightened until a sufficient seal is provided for the open of the pipe 12. Once in this state, the interior of the pipe may then be pressurized for conducting a test or any other purpose. The sealing plate 104 may be provided with one or more ports 108 to which may be connected pressurizing means, pressure gauges or any other instrument or apparatus.

As also shown in FIG. 10, in some instances, a reinforcement apparatus 110 may be used within the interior of the pipe so as to brace against the compressive forces of the clamp 90. In one example, the reinforcement apparatus 110 comprises a plurality of radially extending arms 112 connected together at a central hub 114. The hub 114 would generally be positioned on the longitudinal axis of the pipe 12. The ends of the arms 112 opposite the hub 114 preferably terminate in a pad 116 adapted to bear against the inner surface of the pipe 12. Each of the arms are provided with tensioning means 118 that serve to lengthen the arms so as to force the pads 116 against the wall of the pipe 12. In one aspect, the tensioning means 118 are formed by a combination of the arms 112 having a threaded portion and lengthening nuts associated with such threaded portions. Such means of lengthening a rod are known in the art. Similarly, any other means of lengthening the arms 112 may be used and the invention is not limited to any particular means for achieving such purpose. In certain cases, such as for example with large diameter pipes, the arms 112 of the reinforcement apparatus 110 may be provided with a support ring 120 to prevent or reduce movement of the arms 112 outside of the plane of the reinforcement apparatus 110. It will be understood that any number of arms 112 may be provided on the reinforcement apparatus 110.

As will be understood, in use, the reinforcement apparatus 110 would be positioned inside of the pipe 12 prior to placement of the sealing plate 104. Moreover, the reinforcement apparatus 110 would be positioned prior to establishing the clamping force of the clamp 90 on the pipe 12. In this way, as the clamp 90 is tightened over the outer wall of the pipe 12, the reinforcement apparatus 110 serves to prevent any inward deflection or deformation of the pipe 12.

In some cases, the inner surface of the clamp 90 (or 68d) may be provided with a gripping means such as teeth or ribs etc. However, in a preferred embodiment, the inner surface of the clamp (90, 68d etc.) is smooth as to prevent damage to the surface of the pipe 12.

Figure 11:
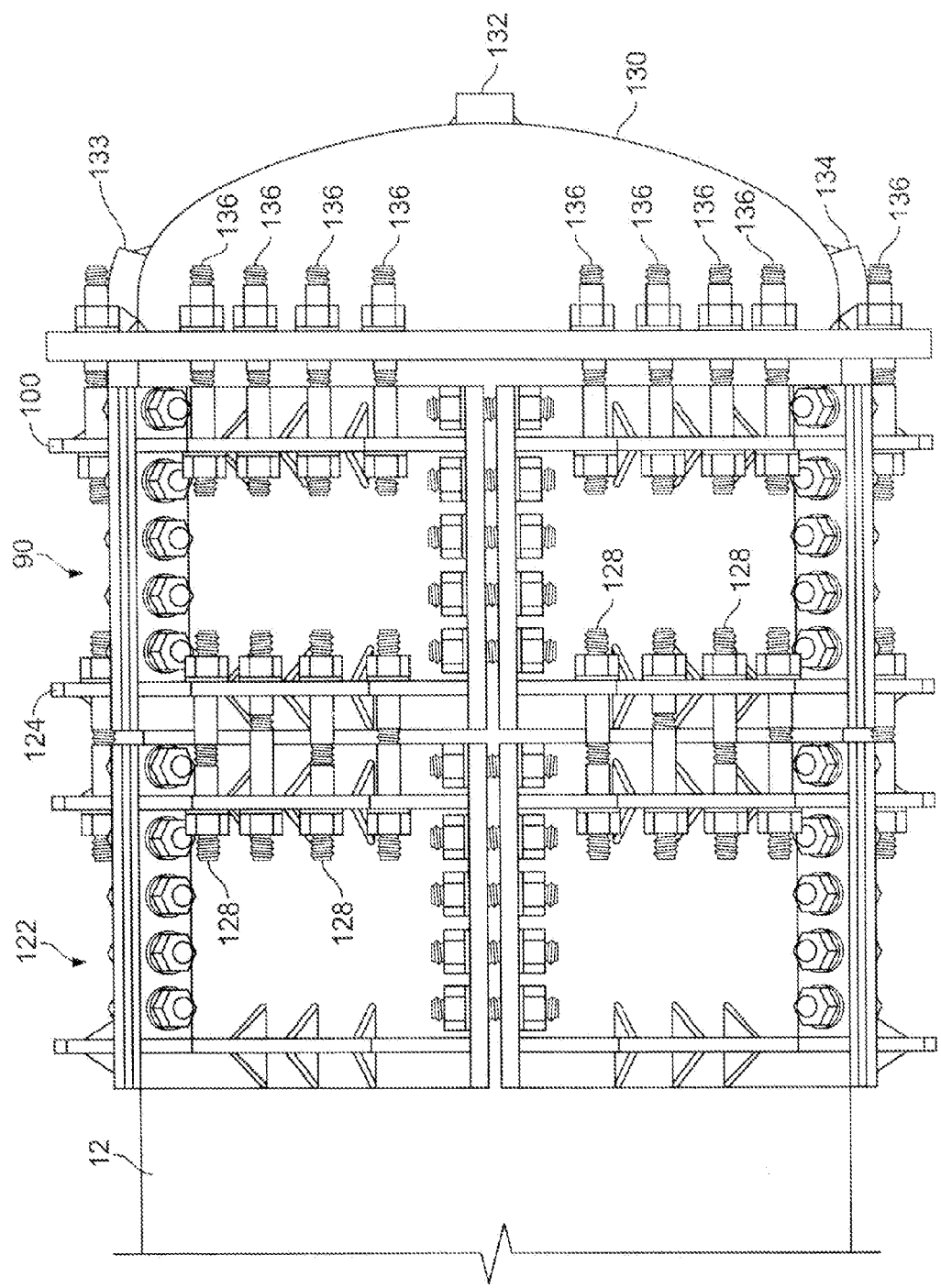
FIG. 11 is side view of another aspect of the invention shown in FIG. 10.

FIG. 11 illustrates another embodiment of the invention described in FIG. 10. In FIG. 11, the clamp 90 is shown as above, provided over a pipe 12 and proximal to an open end of the pipe to be sealed. However, as shown, a further circumferential clamp 122 is provided adjacent to the clamp 90. The clamp 122 is of the same general construction as clamp 90 described above. As illustrated, clamp 122 is positioned on the side of the clamp 90 opposite the opening of the pipe 12. As will be understood, the additional clamp 122 provides added clamping force. In order to establish a physical connection between the clamps, clamp 90 is provided with an additional radially extending circumferential flange 124 on a side opposite to the flange 100 described above. Clamp 122 includes at least one radially extending circumferential flange 126, on the side adjacent to the clamp 90. The flanges 124 and 126 are provided with a plurality of bolt holes that are aligned during installation so as to allow bolts 128 to extend therethrough. Nuts 130 cooperate with the bolts 128 to securely connect the clamps 122 and 90 together. Preferably, bolt holes 128 are evenly spaced along the circumference of the flanges 124 and 126. As will be understood, connection of the clamps 122 and 90 serves to provide additional clamping force since the clamping surface area is increased. In the above description, the clamps 122 and 90 and the respective flanges 124 and 126 have been described a singular elements. However, as described above, each is comprised of two or more clamp sections that are connected together to form such elements. As shown in FIG. 11, the clamp 122 may be provided with a further radially extending circumferential flange 125 to which another clamp may be connected if necessary. It will be understood that any number of clamps can be combined in order to provide any desired level of clamping force.

As also shown in FIG. 11, the sealing plate 130 comprises a bell-shaped element. The sealing plate 130 functions in the same manner as the sealing plate 104 described previously. However, the curved, or outwardly convex structure of the plate 130 allows, for example, a number of ports 132, 133, 134 to be provided over the surface thereof. The sealing plate 130 is secured to the clamp 90 using bolts 136 and associate nuts as described previously.

Figure 12:
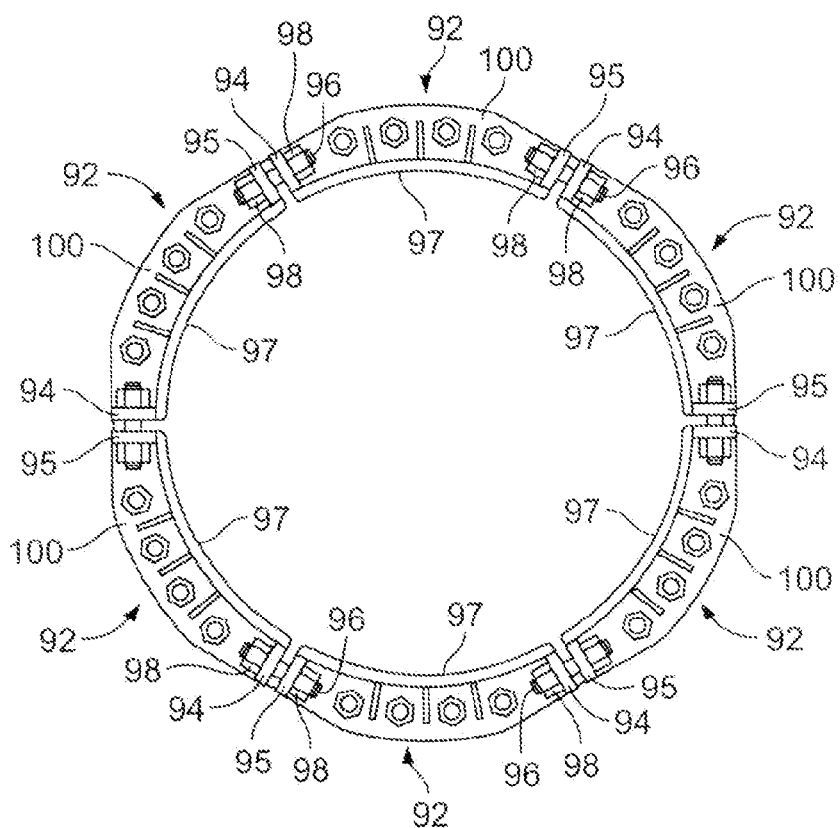
FIG. 12 is an end view of a clamp shown in FIGS. 10 and 11.

FIG. 12 provides an isolated view of a clamp such as clamp 90 or 122 shown in FIGS. 10 and 11. As seen, the clamp of FIG. 12 is comprised of six essentially identical sections 92. For convenience, when referring to the clamp sections collectively (or portions of such clamp sections), the element number 92 is used without the letter suffixes. Each section includes a curved inner surface 97 adapted to conform to the outer surface of a pipe (not shown) to which the clamp is to be secured. As described above, each section includes opposing radially extending, longitudinal connecting flanges 94 and 95, which, when the clamp is assembled, are placed in opposing arrangement as shown in FIG. 12. Bolts 96 and associated nuts 98 serve to connect each section 92 together so as to form the clamp 90 for circumferentially fitting over the surface of a pipe. As described above, a space is preferably provided between at least some of the adjacent clamp sections 92 so as to allow sufficient clearance for the sections to be tightened towards each other, and thereby, tightened over the outer surface of the pipe. Such tightening serves to provide the necessary clamping force over the circumference of the pipe. Each of the sections 92 further includes a radially extending, circumferential sealing flange section 100 that is adapted to engage the sealing plate when the clamp is in use (as discussed above).

Figure 14:
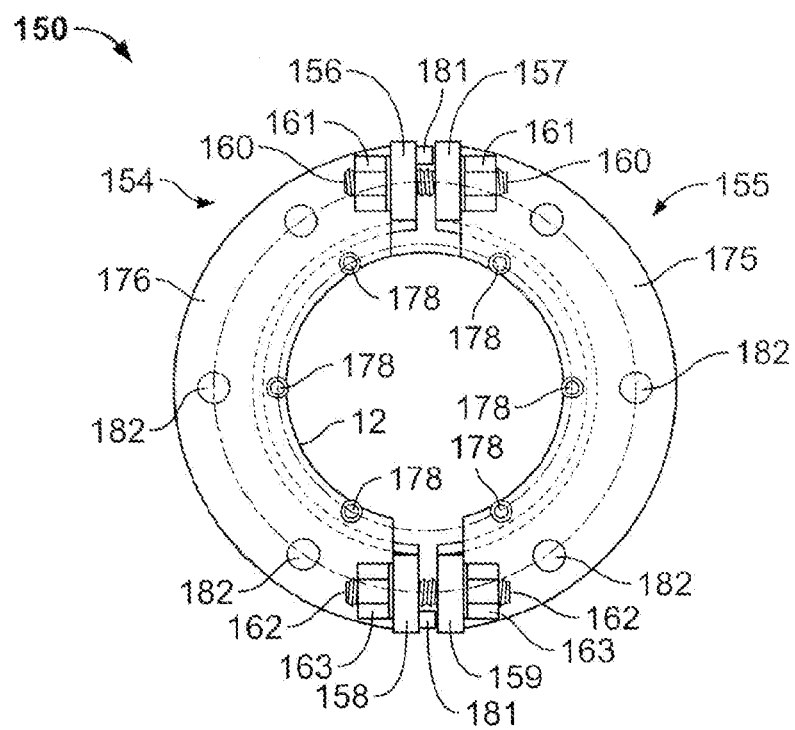
FIG. 14 is an end view of the embodiment shown in FIG. 13.
Figure 13:
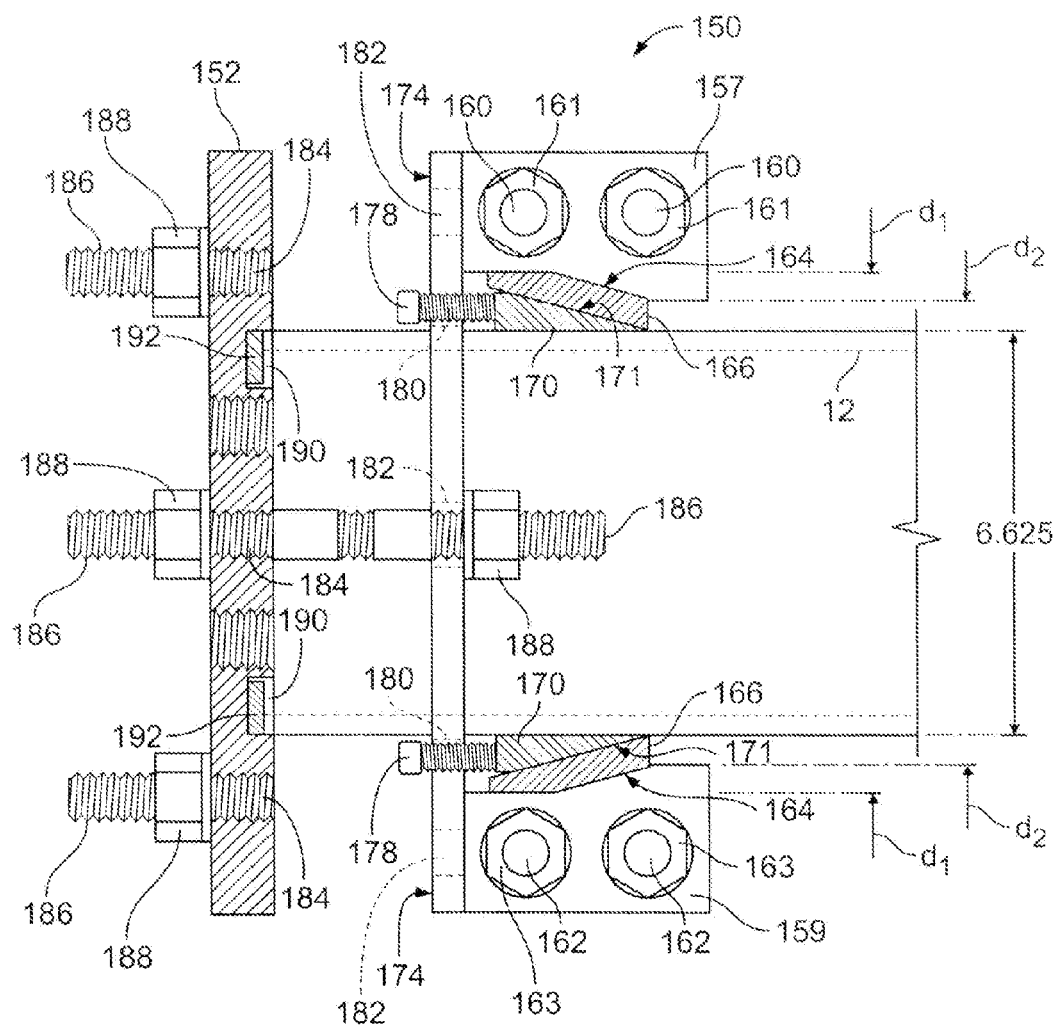
FIG. 13 is a side cross-sectional view of another embodiment of the external clamp according to the invention.

FIGS. 13 and 14 illustrate another embodiment of the invention. As shown the embodiment of FIGS. 13 and 14 functions in effectively the same manner as above. That is, in general, a pipe 12 is provided with a circumferential clamp 150 proximal to an open end of the pipe. The clamp 150 is tightened over the outer surface of the pipe 12 so as to secure same and to prevent relative movement between the clamp and the pipe 12. As shown in FIG. 13, a sealing plate 152 is provided against the open end of the pipe 12 and subsequently secured to the clamp 150.

As shown in FIG. 13, the clamp 150 of this embodiment is operable differently from that of the previous figures. Specifically, the clamp 150 is comprised of two or more clamp sections. In the embodiment shown in FIGS. 13 and 14, the clamp 150 is comprised of two sections, 154 and 155. As described above, the clamp may be formed using any number of sections, depending upon, inter alia, the size of each section and the outer diameter of the pipe in question. In the case where the clamp 150 is formed in two sections, it will be understood that each section will have a generally "C" shaped structure as shown in FIG. 14. In cases where a plurality of clamp sections are required, it will be understood that the shape of the sections will vary. The sections 154 and 155 include radially extending, longitudinal "connecting" flanges. Thus, for section 154, the connecting flanges are shown at 156 and 158. For section 155, the connecting flanges are shown at 157 and 159. Each of the connecting flanges 158 to 159 are provide with bolt holes, positioned so as to be aligned when the clamp is in use. In such position, "clamping" bolts 160 and 162 are inserted through the bolt holes of opposed connecting flanges of adjacent clamp sections. Nuts 161 and 163 are provided on the clamping bolts 160 and 162, respectively, so as to secure the connecting flanges against each other. Thus, as shown in FIG. 14, bolts 160, in combination with nuts 161, serve to secure the connecting flanges 156 and 157 together. Similarly, bolts 162 and nuts 163 serve to secure the connecting flanges 158 and 159 together. In this manner, the sections of the clamp 150 are joined together to form a generally annular shaped structure forming a concentric ring over the outer circumference of the pipe 12.

Once the sections forming the clamp 150 have been assembled as discussed above, the clamp 150 is then secured to the outer surface of the pipe 12. In order to achieve this, the clamp 150, once formed (by connecting the respective clamp sections) is provided with two inner diameters, d1 and d2, both of which are larger than the outer diameter of the pipe 12. As shown in FIG. 13, the first inner diameter, d1, is larger than the second inner diameter d2. When the clamp is in use, the section of the clamp having inner diameter d1 is positioned proximal to the open end of the pipe 12. The opposite end of the clamp (i.e. opposite the open end of the pipe 12) is provided with the inner diameter d2. The clamp 150 further includes a ramped surface 164 extending between the two diameters d1 and d2. In a preferred embodiment, a shoe 166 is provided adjacent the ramped section 164. The shoe 166 serves to extend the ramped surface 164. As will be understood by persons skilled in the art upon reviewing the present description, in other embodiments of the invention, the shoe 166 may be omitted or substituted with other similar functioning elements. In this description, the shoe 166 is described as a unitary structure provided on the clamp. However, it will be understood that the shoe 166 may be formed as separate sections associated with or integral with each of the sections forming the clamp 150.

The clamp 150 is also provided with a gripper ring 170, which is formed by at least two sections that are separated by spacing. For convenience, the gripper ring 170 will be discussed further as a unitary element. As shown in FIG. 13, the gripper ring 170 has a generally annular ring shape preferably with a constant inner diameter capable of sliding over the outer circumference surface of the pipe 12. The outer surface of the gripper ring 170 is provided with a ramped structure oppositely oriented to the ramped section 164 of the clamp 150. As shown in FIG. 13, this results in the gripper ring 170 having a varying outer diameter, which is greater at the proximal end, proximal to the open end of the pipe 12, and less at the distal end, opposite to the open end of the pipe 12. The outer surface of the gripper ring is thereby provided with a ramped surface 171. As shown, the distal end of the gripper ring 170 is adapted to be received under the ramped section 164 of the clamp and, where present, under the shoe 166. When the clamp 150 is in position, the gripper ring 170 is positioned proximal thereto, thereby placing the gripper ring closer to the opening of the pipe 12 (as shown in FIG. 13). In this way, as the gripper ring 170 is advanced axially in the distal direction over the pipe 12, i.e. away from the pipe opening and against the clamp 150, the gripper ring 170 is urged inwardly due to the interaction between the opposed ramped sections 171 and 164. In the latter case, it will be understood that the ramped surface 164 will be reflected in the structure of the shoe 166 and, where such shoe is present, the inward deflection of the gripper ring 170 would be caused by interaction with such shoe.

The clamp 150 further includes a radially extending, circumferential sealing flange 174. As shown in FIG. 14, the sealing flange 174 is comprised of flange sections 175 and 176, provided, respectively, on clamp sections 155 and 154. For convenience, the flange 174 will be described as a unitary structure but will be understood to have such general structure once the clamp 150 is assembled.

A plurality of "gripper" bolts 178 extend through openings 180 in the flange 174. The gripper bolts 178 extend through the openings 180 in the proximal to distal direction (i.e. along the axis of the pipe 12, when the clamp 150 is in the assembled state there-over), wherein the bolt heads are proximal to the opening of the pipe 12. The terminal ends of the gripper bolts 178 are adapted to bear against the proximal ends of the gripper ring 174. Thus, in this arrangement, tightening of the bolts 178 forces the gripper ring 170 against the inner surface of the clamp 150 and, therefore, under the ramped surface 164 thereof or the shoe 166. In either case, the gripper ring 170, being of at least two sections, is deflected inwardly and forced against the outer surface of the pipe 12. With sufficient force applied by the tightening bolts, the gripper ring 170 is pressed tightly against the pipe surface to create a strong clamping force. This is continued until a sufficient clamping force is achieved wherein relative axial movement of between the clamp 150 and the pipe 12 is prevented.

In one aspect, the bolts 178 are received within cooperatively threaded openings 180. In other aspects, a nut and threaded rod arrangement can be used to achieve the same purpose. In other aspects, the bolts 178 may be replaced with hydraulic rams or magnetically driven rods etc. It will be appreciated that the invention is not limited to any specific means of advancing the gripper ring 170. The bolts 178, and correspondingly threaded openings 180, provide one such means. As shown in FIG. 14, a plurality of bolts 178 are provided and are generally equally spaced circumferentially over the clamp. Such an arrangement is preferred since it serves to advance the gripper ring 170 equally over the circumference of the clamp 150.

The circumferential sealing flange 174 is also provided with a plurality of generally circumferentially spaced bolt holes 182. Similarly, the sealing plate 152 is also provided with corresponding bolt holes 184. When the apparatus of the invention is positioned on the pipe 12, the sealing plate 152 is oriented so as to align bolt holes 184 with bolt holes 182 provided on the flange 174. Once in this orientation, "sealing" bolts 186 are inserted through bolt holes 184 and 182 and nuts 188 are used to urge sealing plate 174 towards the clamp 150. As discussed in reference to other embodiments of the invention, the sealing plate 152 is preferably provided with a groove or race 190 having dimensions sufficient to receive the open end of the pipe 12 therein. In order to form a secure seal between the sealing plate 152 and the open end of the pipe 12, a sealing material 192 is preferably provided within the groove 190. The sealing material may be an O-ring, a gasket material or any other sealing material as described herein or as would be apparent to persons skilled in the art.

In operation, the apparatus illustrated in FIGS. 13 and 14 are utilized as follows. Firstly, as described above, the clamp 150 is assembled from the two or more pieces (described above) over the outer surface of the pipe 12, adjacent to an opening thereof. The sections of the gripper ring 170 are positioned adjacent the clamp 150. As noted in FIG. 13, the sections of the gripper ring 170 are positioned so that the portion having the smaller outer diameter is distally oriented, away from the opening and towards the clamp 150. Thus, the gripper ring 170 is positioned so as to align its ramped section 171 in an opposite manner as compared to the ramped section 164 of the clamp 150. Thus, the thinner portion of the gripper ring 170 is positioned to be received within an annular space created by the outer wall of the pipe 12 and the larger inner diameter portion of the clamp 150.

Once the clamp and gripper ring sections are assembled in the desired position over the pipe 12, the clamp sections are secured together by means of clamping bolts 160, 162 and the associated nuts 161, 163, respectively. This results in the clamping sections being urged together thereby also causing the gripper ring sections to be urged together. The clamp sections may optionally be provided with spacers 181 such as that shown in FIG. 14. Such spacers serve to limit the amount of compression exerted by the clamp 150 over the gripper ring 170. In such manner, the desired clamping force on the clamp would be controlled by the gripper bolts 178 as discussed further below.

Once the clamp 150 is assembled over the pipe 12 as discussed above, the gripper bolts 178 are then tightened so as to force the gripper ring 170 towards the clamp 150 and against the ramped portion 164 or, where present, the shoe 166, which is provided with an equally ramped surface. In the process, the gripper ring 170 is radially compressed and thereby forced against the outer wall of the pipe 12. Further tightening of the bolts 178 creates a tight fit between the gripper ring 170 and the wall of the pipe 12, thereby preventing relative axial movement between the clamp 150 and the pipe 12. Once the clamp 150 is thus anchored to the wall of the pipe 12, the sealing plate 152 is positioned and aligned with the circumferential flange 174 of the clamp 150. Tightening of the nuts 188 over the sealing bolts 186 urges the sealing plate towards the clamp 150 (which is clamped on the pipe 12) and, in the result, forces the sealing plate 152, and in particular the groove or race 190 thereof, against the open end of the pipe 12. The nuts 188 are tightened until the desired degree of sealing is achieved. With the sealing means 192 is place, a sealing arrangement is achieved between the open end of the pipe 12 and the sealing plate 152. At this point, the interior of the pipe 12 may be pressurized and subjected to pressure testing for its integrity.

Figure 15:
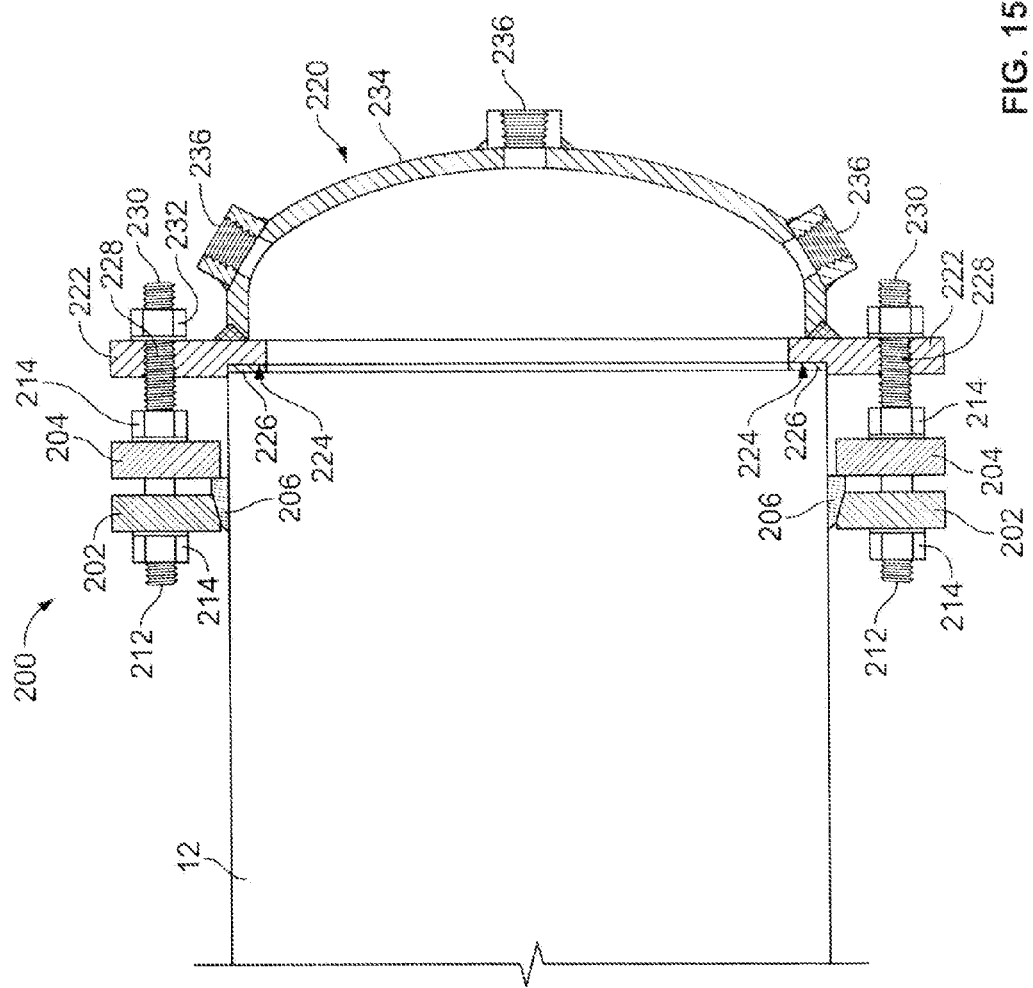
FIG. 15 is a side cross-sectional view of another embodiment of the external clamp according to the invention.
Figure 19:
FIGS. 18 and 19 are front and side cross-sectional views of the clamping ring shown in FIG. 15.
Figure 20:
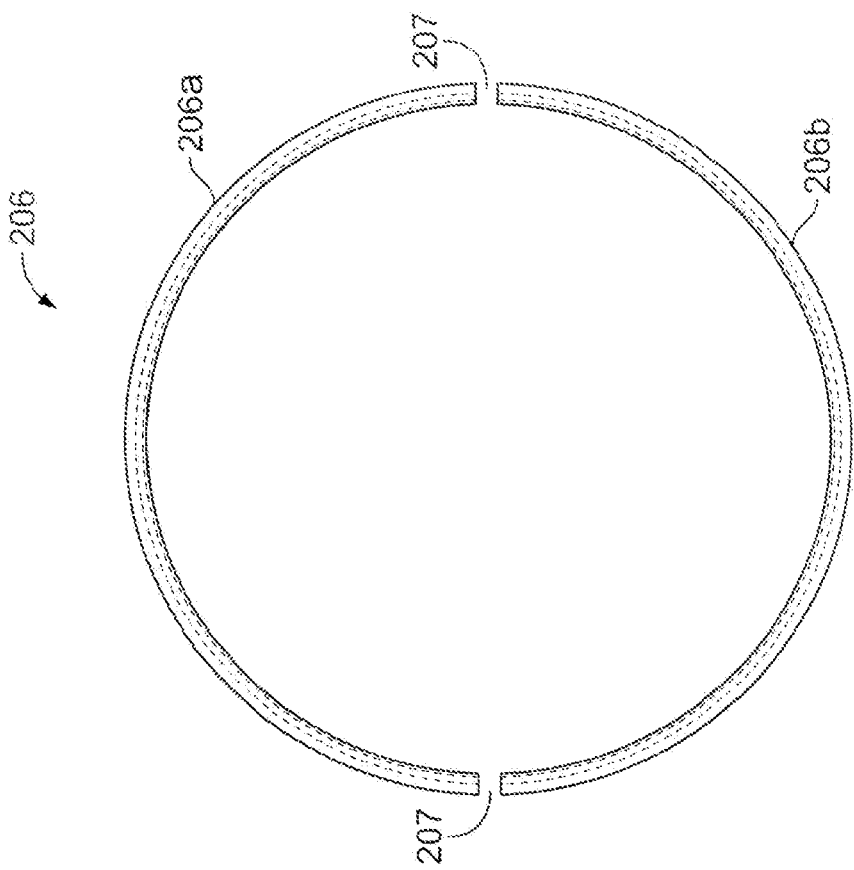

FIGS. 15 to 22 illustrate features of another embodiment of the invention. As shown in FIG. 15, the apparatus of the invention includes a clamp 200 that is adapted to be secured to the outer wall of a pipe 12. The clamp includes a first, or squeeze ring 202 and a second, or clamping ring 204. The first and second rings 202 and 204 are preferably unitary structures that are generally annular in shape. The rings 202 and 204 have respective internal and external diameters, with the internal diameters of each being slightly larger than the outer diameter of the pipe 12 so as to allow the rings to be slidably provided over the pipe. The clamp 200 further includes a generally annular gripper ring 206, which also has an internal diameter and an external diameter. The internal diameter of the gripper ring 206 is reducible, as described further below. However, in its initial state, the internal diameter of the gripper ring 206 is greater than the external diameter of the pipe 12 so as to allow the ring 206 to be slidably provided thereover. Gripper ring 206 is preferably formed of two or more sections. As shown in FIG. 20, the gripper ring 206 is formed, according to one embodiment of the invention, in two sections 206a and 206b. The purpose of such multiple sections for the gripper ring 206 will become apparent in the following description.

Figure 18:
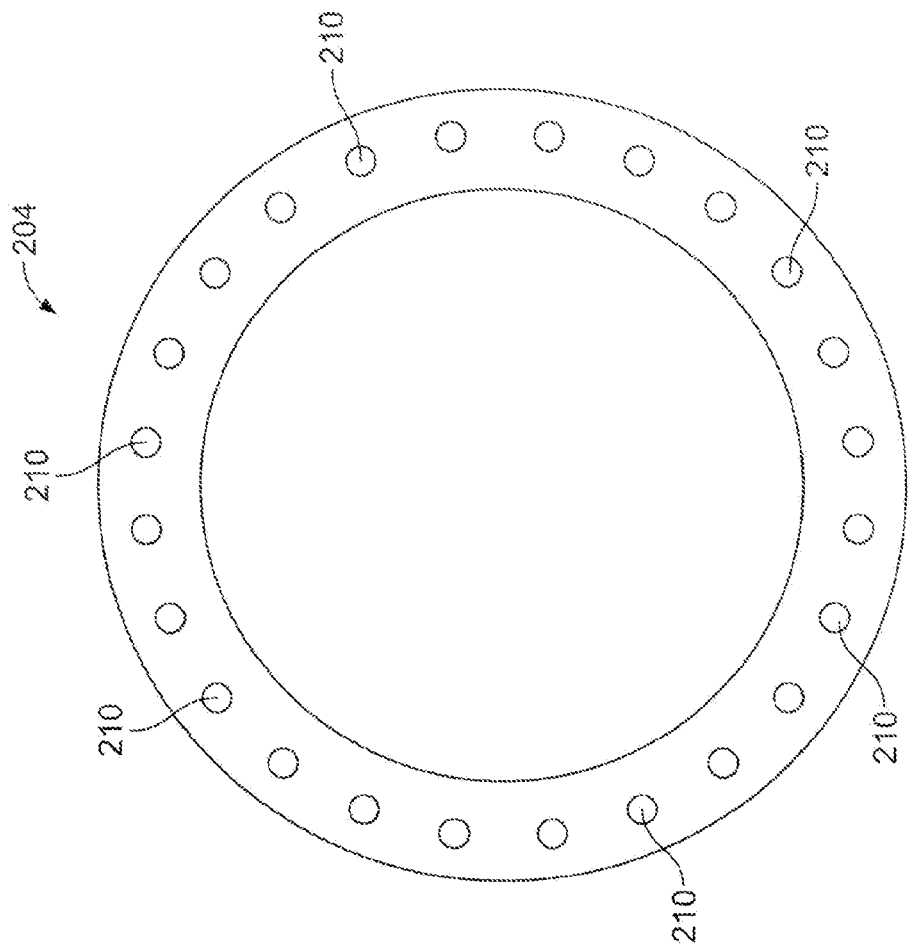

As shown in FIG. 15, the clamp 200 is formed by first providing the squeeze ring 202 over the outer surface of the pipe 12. This is achieved by sliding the ring 202 over the pipe, adjacent an open end thereof. The gripper ring 206 is next positioned adjacent the squeeze ring 202. As mentioned above, the gripper ring 206 is preferably provided in two or more sections. Next the clamping ring 204 is positioned over the pipe as shown in FIG. 15. The squeeze ring 202 and clamping ring 204 are each provided with a plurality of bolt holes, 208 and 210, respectively, as shown in FIGS. 16 and 18. In positioning the portions of the clamp 200 over the pipe, the bolt holes 208 and 210 of the squeeze ring 202 and clamping ring 204 are aligned. Once in this position, "clamping" bolts 212 are inserted into the aligned bolt holes and such bolts are tightened with nuts 214. As will be understood in reviewing FIG. 15, as the nuts 214 are tightened, the clamping plate and squeeze plate are urged towards each other to produce the required clamping force to secure the clamp 200 over the outer diameter of the pipe 12.

Figure 22:
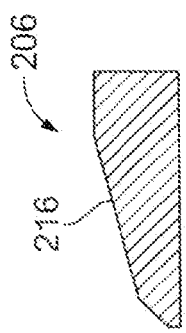
FIGS. 20, 21 and 22 are front, side cross-sectional and detailed cross-sectional views of the gripper ring shown in FIG. 15.
Figure 21:
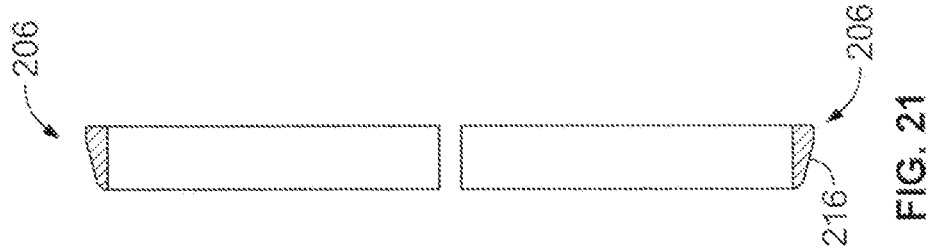

The squeeze ring 202 is preferably provided with a beveled inner diameter. Thus, the internal diameter of the squeeze ring 202 is provided with a ramped surface 214 (as shown in FIGS. 15 and 17), such that a smaller inner diameter is provided distal to the open end of the pipe 12 and a larger inner diameter is provided proximal to such open end. The gripper ring 206 also comprises a generally annular shaped structure but having a generally constant inner diameter, which faces the outer surface of the pipe 12 when the apparatus is in use. The outer diameter of the gripper ring 206 includes a ramped surface 216 (as shown in FIGS. 15, 21 and 22). This results in the gripper ring 206 having a larger outer diameter proximal to the opening of the pipe 12 and a smaller outer diameter distal to the pipe opening. The clamping ring 204 is generally annular in shape is does not necessarily include any beveled or ramped surfaces. However, the inner diameter of the clamping ring 204 is smaller than the outer diameter of the gripper ring 206. This arrangement of the squeeze ring, gripper ring and clamping ring is shown in FIG. 15.

As shown, in assembling the apparatus over a pipe 12, the squeeze ring 202 is first slid over the pipe 12, followed by the gripper ring 206 and finally the clamping ring 204. It is noted that the thin, distal portion of the gripper ring 206 is adapted to be inserted between the proximal end of the squeeze ring 202 and the outer wall of the pipe 12. As the nuts 214 are tightened and the squeeze ring 202 is advanced against the clamping ring 204, the gripper ring 206 is therefore urged against the outer wall of the pipe 12. The proximal end of the gripper ring 206 is biased against the clamping ring 204 and, therefore, prevented from axial movement with respect to the clamping ring. As explained above, the gripper ring 206 is preferably provided in two or more sections, as illustrated in FIG. 20. Where the gripper ring 206 is provided in two sections, as shown in FIG. 20, each of such sections 206a and 206b have a generally arc shaped structure. The ends of each section, 206a and 206b, are preferably separated by space 207. The spaces 207 allow the sections of the gripper ring 206 to be moved radially inwardly towards each other, thereby resulting in a reduction of the inner diameter of the gripper ring 206. Thus, as the gripper ring 206 is urged towards the wall of the pipe 12, the sections forming the gripper ring 206 are urged together, thereby reducing the inner diameter of the annular gripper ring 206 and radially compressing the gripper ring 206 over the outer wall of the pipe 12 to form a tight, clamping engagement therewith. Thus, tightening of the nuts 214 results in the clamp 200 being secured to the pipe wall so as to prevent relative axial movement there-between.

Returning to FIG. 15, the apparatus of the invention is also provided with a sealing plate 220, which functions generally in the same manner as described previously with respect to other embodiments. In the embodiment of FIG. 15, the sealing plate 220 includes a flange portion 222 having an outer diameter greater than that of the pipe 12 and an inner diameter less than that of the pipe 12. The flange portion 222 is provided with a groove or race 224 that is adapted to receive the open end of the pipe 12. The groove 224 includes a sealing member or membrane 226 that is capable of forming a seal between the groove 224 and the open end of the pipe 12. The flange portion 222 includes a plurality of bolt holes 228 for receiving "sealing" bolts 230. The sealing bolts 230 are adapted to extend to the clamp 200 and be connected thereto. Nuts 232 are also provided, which cooperate with the sealing bolts 230 to advance the sealing plate 220 towards the clamp 200. In the result, the sealing plate is forced against the open end of the pipe 12 and the opening of the pipe is sealed within the groove 224. Such sealing action is similar to that described above with respect to other embodiments of the invention. In one embodiment, the bolts 230 may be secured to the clamping ring 204 of the clamp. In another embodiment, as illustrated in FIG. 15, the sealing bolts 230 and clamping bolts 212 may comprise the same entity. Thus, the single bolt serves to join the clamping and squeeze rings together as well as to urge the sealing plate 220 towards the clamp 200. In such case, the bolts 217 are elongated and capable of extending through the bolt holes 228 in the flange portion 222 of the sealing plate 220. Thus, the two sets of nuts 214 and 232 would engage the same bolt but would serve to provide, respectively, the required clamping force and sealing force. It will be understood that the use of a single set of bolts may be advantageous in terms of reducing the number of elements of the apparatus. However, the apparatus of the invention will be understood to function equally with separate sealing and clamping bolts. In such case, two sets of circumferentially spaced bolt holes will be provided on the clamping plate 204. One set will be used to receive the clamping bolts 212 and the other set will be used to receive the sealing bolts 230.

The sealing plate 220 also includes a body portion 234 that is preferably integral with the flange portion 222. The body portion 234 of the sealing plate 220 may comprise a generally flat, plate-like structure as described previously. However, in the embodiment shown in FIG. 15, the body portion 234 has convex shape, protruding beyond the opening of the pipe 12. The body portion 234 may then be provided with a number of ports 236, to which may be connected pressurizing means (such as a hose to supply a pressurizing fluid to the interior portion of the pipe 12), evacuation means (such as a hose to drain the pressurized fluid from the pipe 12), pressure gauges, temperature gauges, relief valves etc. Various other devices for connection to the ports 236 will be apparent to persons skilled in the art.

Figure 23:
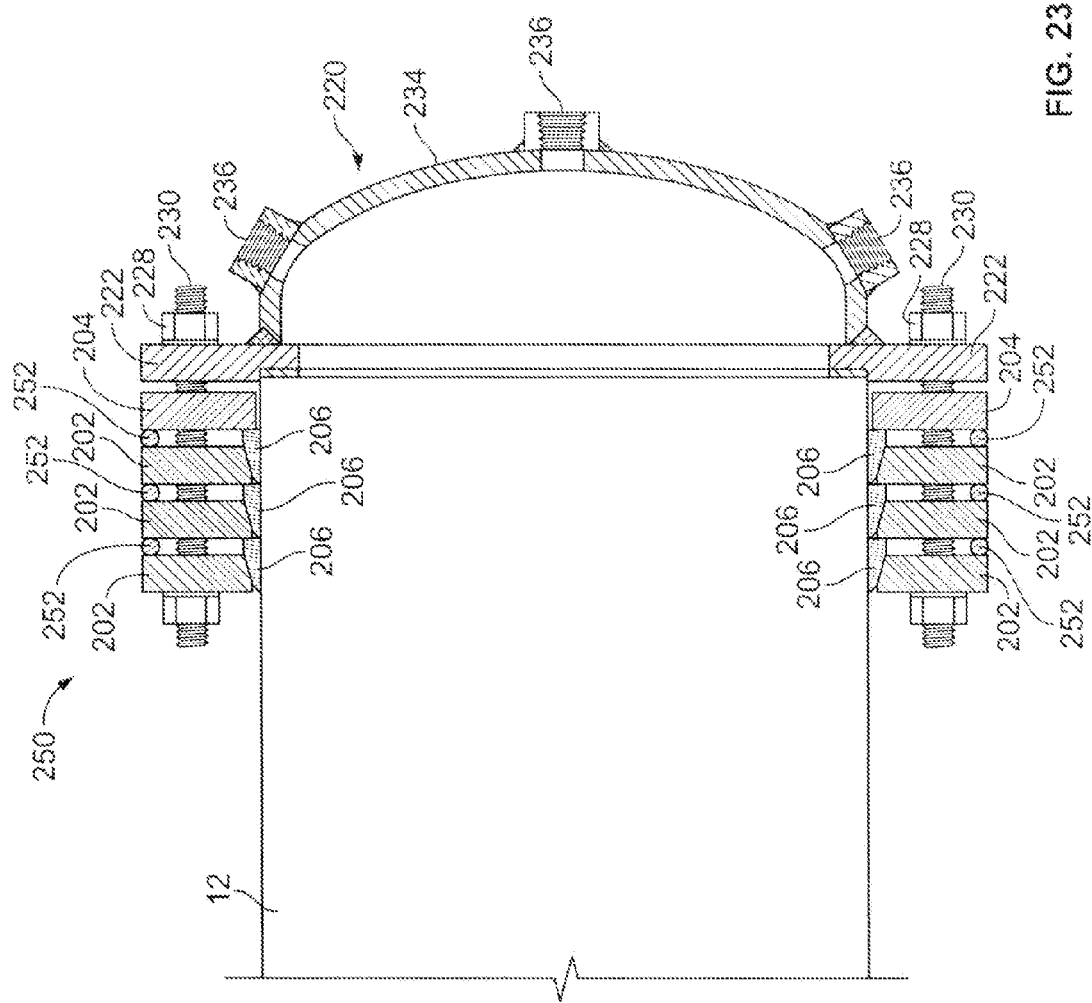
FIG. 23 is a side cross-sectional view of an embodiment of the invention shown in FIG. 15 wherein a plurality of external clamps are combined.

FIG. 23 illustrates a variation of the apparatus shown in FIG. 15, and illustrates another embodiment of the clamp, shown generally at 250. In FIG. 23, the sealing plate 220 is essentially the same as that discussed previously. Further, the clamping ring 204 of the clamp 250 is also as described above. However, as shown, the clamp 250 of FIG. 23 is provided with a plurality of squeeze rings 202 and gripper rings 206. As will be understood, by providing a plurality of squeeze and gripper rings, 202 and 206, the amount of clamping force offered by the clamp 250 is increased. In the result, the clamp of FIG. 23 is able to withstand higher pipe pressures than the clamp of FIG. 15. The number of additional squeeze rings and clamping rings will vary based on the desired clamping force required and it will be understood that any number of such rings may be provided for any given clamp.

In order to ensure that each squeeze ring 202 acts upon a respective gripper ring 206, each of the squeeze rings 202 are separated by a separation ring 252. As will be understood, the separation rings 252 serve to prevent binding between each of the squeeze rings and to ensure that each of such squeeze rings act upon respective gripper rings 206. The separation rings 252 may comprise, for example, O-rings.

It will be understood that in situations where a given length of a pipe is to be tested, both ends of the pipe can be sealed using any of the sealing apparatus described above. In such case, the ends of the pipe will each be provided with the same or different ones of the apparatus of the invention. Each end of the pipe would thus be sealed and the interior of the pipe may then be pressurized for conducting an integrity test.

As described above, in some of the embodiments of the invention, the clamp includes a gripper plate (formed of two or more sections) that is provided with a ramped surface adapted to engage an oppositely ramped surface on another portion of the clamp. In some cases, such oppositely ramped surface is provided on the clamp body or on a "squeeze" ring as described above. It will be noted in the described embodiments that the gripper plate is positioned so that the thinner portion of the gripper plate is oriented away from the pipe opening. As seen, for example in FIGS. 13 and 15, and as will be understood by persons skilled in the art, such an orientation would be preferred. Specifically, once the clamp is tightened against the exterior surface of the pipe, the clamp would be securely engaged and the sealing plate is then attached thereto so as to seal the open end of the pipe. Subsequently, when the interior of the pipe is pressurized (such as in cases where a pressure test is conducted on the pipe), it will be understood that such pressure will act to force the sealing plate of the apparatus away from the pipe opening in the axial direction. However, since the sealing plate is secured to the clamp by means of the sealing bolts (i.e. the bolts connecting the sealing plate to the clamp), the axial movement of the sealing plate would also exert an axial force on the clamp. In the result, the clamp body or squeeze ring would be forced to travel over the gripper ring due to the opposed ramped surfaces. As will be understood, such movement would cause the gripper ring to be further compressed against the external surface of the pipe and, thereby, result in strengthening the gripping force between the gripper ring and the exterior of the pipe. Thus, even in the situation where a high pressure applies an axial force on the clamp, a corresponding increase in clamping force results. The above mentioned orientation of the gripper ring and the other clamp components comprises a preferred arrangement of the apparatus of the invention, so as to allow increased clamping force upon application of an axial force (such as due to pressurization of the pipe). However, it will be understood that the orientation of the gripper ring and the clamp body or the squeeze ring may be reversed while still providing an adequate clamping force on the pipe. For example, such reversed orientation may be used in cases where the pipe is not pressurized or where the required pressurization is minimal.

In the above description, reference is made to the use of bolts for securing sections of the clamp together and for securing the sealing plate to the clamp. Such bolts are described as extending through bolt holes provided in respective flanges. However, although such arrangement is preferred, it will be appreciated that other means may be used to achieve the desired purpose. For example, the respective flange may be urged together using compression clamps etc. Magnetic means may also be used to urge the respective elements towards each other. In addition, the above description has referred to the use of threaded bolts having nuts provided on each end thereof. However, in another embodiment, the bolts may include heads, whereby only a single nut is required to achieve the required tightening. For this reason, the aforementioned bolts and equivalent elements that serve a connection function (i.e. connecting two or more other elements together) may be referred to generally as "connecting elements".

As illustrated in FIGS. 7 to 23 and as described above, the circumferential clamp that is secured to the external surface of a pipe, is preferably positioned distally of the open end of the pipe by at least a short distance. As will be understood, such positioning provides a degree of separation between the clamp and the sealing plate, thereby allowing the sealing plate to be sufficiently sealed against the end of the pipe without being hindered by the clamp itself. Furthermore, it will be understood that placing a circumferential clamp close to an end of the pipe, and subjecting the pipe to a strong radially compressive force may damage the end of the pipe and prevent it from being connectable to other pipes or to other apparatus (such as vessels, flanges etc.). It will be understood that the above described internal reinforcement (such as shown at 110 in FIG. 10) may be used in combination with any of the external clamps described herein. In addition, having the ability to axially position the clamp at any location along the length of the pipe allows for a desired amount of clearance in the event that a weld is located near the open end of the pipe.

It will be understood that the external clamp and sealing plate of the invention can also be used on pipes that include a bend. For example, in a pipe comprising an elbow, the clamp may be positioned on one side of the bend with the sealing plate covering the pipe opening on an opposite side of the bend. In such case, the connecting elements between the clamp and the sealing plate may be adapted or oriented to provide the same sealing force as described above. For example, the clamp may be provided with an extension for cooperating with the connecting elements to engage the sealing plate. Various other such modifications to the invention are also possible.

As discussed above, the apparatus of the invention is preferably used for sealing an end of a pipe so that the interior of the pipe can be pressurized such as for testing the integrity of the pipe. In one example, the integrity test is used for testing a weld that may be present on the pipe. Such a weld may serve to connect two pipe segments or to connect the pipe to another apparatus.

It will be understood that the above discussion has used geometric terms such as annular, disc, circumference, etc., for ease of reference. However, these terms should not be construed as limiting the invention to any specific shape of nozzle or pipe and various modifications of the apparatus will be apparent to persons skilled in the art to adapt same to any shape or design.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The disclosures of all prior art recited herein are incorporated herein by reference in their entirety.

I claim:

1. An apparatus for sealing an open end of a pipe comprising:
   at least one generally annular shaped clamp having an inner diameter adapted to be provided over an outer surface of the pipe, the clamp including a means for circumferentially gripping the outer surface of the pipe and preventing relative axial movement there-between;
   a sealing plate, adapted to cover and seal the open end of the pipe;
   an urging means for urging the sealing plate axially towards the clamp and against the open end of the pipe when said apparatus is in use;
   the clamp comprising at least two clamp sections adapted to be joined together;
   each of the clamp sections including connecting flanges, provided at opposite ends of respective clamp sections;
   a plurality of first connecting elements for connecting the opposed flanges of adjacent clamp sections, when the apparatus is in use, and for tightening adjacent clamp section together;
   each of the clamp sections including a sealing flange extending along at least a portion of the length thereof, wherein, when said clamp sections are assembled, said sealing flanges form a generally circumferential flange on the clamp.

2. The apparatus of claim 1, wherein the sealing plate includes a groove for receiving the open end of the pipe, the groove including a sealing means for forming a seal between the groove and the open end of the pipe.

3. The apparatus of claim 1, wherein the urging means comprises a plurality of second connecting elements extending between the generally circumferential flange of the clamp and the sealing plate, wherein, when said apparatus is in use, said second connecting elements are adapted to force the sealing plate in a direction towards the generally circumferential flange and against the open end of the pipe to form a sealing engagement between the sealing plate and the open end of the pipe.

4. The apparatus of claim 1 further comprising an internal reinforcement assembly for insertion within the pipe and for radially bracing the wall of the pipe.

5. The apparatus of claim 4, wherein the radial reinforcement assembly comprises a hub and a plurality of arms extending radially outwardly from the hub to the inner surface of the pipe wall, when said assembly is in use.

6. The apparatus of claim 5, wherein the length of each of said arms is adjustable.

7. The apparatus of claim 1, wherein the sealing plate includes at least one port for connection to a pressurizing means, a monitoring means or a combination thereof, for pressurizing, venting or monitoring the interior of the pipe.

8. The apparatus of claim 1, wherein the clamp includes:
   a generally annular body having an inner diameter surface, at least a portion of the inner diameter surface including a first ramp extending from a first end to a second end of the annular body, the annular body having an inner diameter that is greater at the first end than at the second end;
   a generally annular gripper ring, coaxial with the annular body, the gripper ring being comprised of two or more sections, and having an inner surface with an inner diameter for engaging the outer surface of the pipe, and an outer surface, at least a portion of the outer surface of the gripper ring including a second ramp, the second ramp extending from a first end of the gripper ring to a second end of the gripper ring, the second ramp being oppositely directed to the first ramp, wherein the second end of the gripper ring is insertable within an annular space between the first end of the annular body and the outer wall of the pipe; and,
   a means for urging the gripper ring and the annular body towards each other for forcing the second ramp under the first ramp, whereby, when the apparatus is in use, the first ramp bears against the second ramp wherein the inner diameter of the gripper ring is reduced resulting in a frictional engagement between the gripper ring and the outer surface of the pipe.

9. The apparatus of claim 8, wherein the means for urging the gripper ring comprises a plurality of bolts provided on the annular body, said bolts being arranged to apply an axial force against the first end of the gripper ring.

10. The apparatus of claim 8, wherein the sealing plate includes at least one port for connection to a pressurizing means, a venting means, a monitoring means or a combination thereof, for pressurizing, venting or monitoring the interior of the pipe.

11. The apparatus of claim 8 further comprising an internal reinforcement assembly for insertion within the pipe and for radially bracing the wall of the pipe.

12. The apparatus of claim 11, wherein the radial reinforcement assembly comprises a hub and a plurality of arms extending radially outwardly from the hub to the inner surface of the pipe wall, when said assembly is in use.

13. The apparatus of claim 12, wherein the length of each of said arms is adjustable.

14. A method for sealing a section of a pipe having an open end, the method comprising:
   securing at least one external clamp circumferentially over the outer surface of the pipe at a location spaced away from the open end, the clamp being frictionally secured to the pipe surface so as to prevent relative axial movement between the clamp and the pipe;
   positioning a sealing plate against the open end of the pipe, for covering and sealing the open end of the pipe;
   connecting the sealing plate to the clamp;
   forcing the sealing plate axially towards the clamp and forming a seal between the open end of the pipe and the sealing plate;
   wherein the clamp comprises a generally annular body formed of at least two sections, and wherein the step of securing the clamp over the outer surface of the pipe comprises connecting and tightening the at least two sections together to cause frictional engagement between the clamp and outer surface of the pipe.

15. The method of claim 14 further comprising pressurizing the interior of the pipe.

16. The method of claim 14 further comprising positioning a radial reinforcement assembly within the pipe, at a location corresponding to the clamp, for radially supporting the wall of the pipe.

17. The method of claim 14, wherein the clamp comprises: a generally annular body having an inner surface, a portion of the inner surface comprising a first ramp; and, a generally annular gripping ring formed of at least two sections, said gripper ring including an outer surface, a portion of the outer surface comprising a second ramp; the method comprising:
   coaxially positioning the annular body and the gripper ring over a pipe such that the first and second ramps are oppositely oriented, wherein the second ramp of the gripper ring is insertable between the first ramp of the annular body and the outer wall of the pipe;

forcing the gripper ring against the annular body to cause radial compression of the gripper ring and frictional engagement of the gripper ring over the pipe outer surface; and, forming a clamping force between the gripper ring and the pipe surface to prevent relative axial movement between the clamp and the pipe.

18. The method of claim 17, wherein the step of forcing the gripper ring comprises urging the gripper ring by a plurality of bolts connected to the annular body.

* * * * *